(12) United States Patent
Gao et al.

(10) Patent No.: US 12,467,679 B2
(45) Date of Patent: Nov. 11, 2025

(54) SENSOR ARRAY FOR SMART FROST DIAGNOSTICS

(71) Applicant: UT-Battelle, LLC, Oak Ridge, TN (US)

(72) Inventors: Zhiming Gao, Knoxville, TN (US); Kashif Nawaz, Knoxville, TN (US); Brian A. Fricke, Oak Ridge, TN (US); Kyle R. Gluesenkamp, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 121 days.

(21) Appl. No.: 18/605,340

(22) Filed: Mar. 14, 2024

(65) Prior Publication Data

US 2025/0109901 A1   Apr. 3, 2025

Related U.S. Application Data

(60) Provisional application No. 63/541,322, filed on Sep. 29, 2023.

(51) Int. Cl.
*F24F 11/41* (2018.01)
*F25D 21/00* (2006.01)
(Continued)

(52) U.S. Cl.
CPC ............ *F25D 21/006* (2013.01); *F24F 11/41* (2018.01); *G01K 7/18* (2013.01); *G01N 27/048* (2013.01);
(Continued)

(58) Field of Classification Search
CPC ........ F24F 11/41; F24F 11/42; F25B 2700/11; F25D 21/02; G01K 7/18; G01K 2201/00; G01N 27/048; G01N 27/223
See application file for complete search history.

(56) References Cited

U.S. PATENT DOCUMENTS 3,882,381 A * 5/1975 Gregory .................. G01W 1/00
324/683
5,257,506 A   11/1993 DeWolf et al.
(Continued)

OTHER PUBLICATIONS

Jarrett, J. H., A new demand defrost control for domestic forced draft refrigerator/freezers and freezers. IEEE Transactions on Industry Applications, (3), 356-364. (1972).
(Continued)

*Primary Examiner* — Jonathan Bradford
(74) *Attorney, Agent, or Firm* — Fox Rothschild LLP

(57) ABSTRACT

Systems and methods implementing a frost sensor comprising a substrate (S); and sub-sensors disposed on the substrate. The sub-sensors comprising: a resistance-based sub-sensor (RSS) formed of a first trace disposed on S in a winding pattern and configured to measure a temperature; a capacitance-based sub-sensor formed of a second trace defining a first electrode and a third trace defining a second electrode (wherein (i) the first and second electrodes comprise interdigitated fingers or other interdigitated structures (including, but not limited to, round, spiral interdigitated electrodes, etc.) configured to detect a change in capacitance due of frost, ice or water, and (ii) the second trace is integrally formed with the first trace); and another RSS formed of a fourth trace defining a third electrode and a fifth trace defining a fourth electrode (wherein (i) the third and fourth electrodes comprise interdigitated fingers or other interdigitated structures (including, but not limited to, round, spiral interdigitated electrodes, etc.) configured to detect a change in resistance due to the frost, ice or water, and (ii) the fourth trace is integrally formed with the third trace).

24 Claims, 24 Drawing Sheets

(51) Int. Cl.
    *G01K 7/18*     (2006.01)
    *G01N 27/04*    (2006.01)
    *G01N 27/22*    (2006.01)

(52) U.S. Cl.
    CPC ....... *G01N 27/223* (2013.01); *G01K 2201/00* (2013.01)

(56) References Cited

U.S. PATENT DOCUMENTS

| | | |
|---|---|---|
| 9,004,369 B2 | 4/2015 | Bortoletto et al. |
| 9,032,751 B2 | 5/2015 | Lacey et al. |
| 10,295,244 B2 | 5/2019 | Qu et al. |

OTHER PUBLICATIONS

Hao, Y.L., Iragorry, J., Castro, D., Tao, Y.X., Jia, S., Microscopic characterization of frost surface during liquid-ice phase change period. In ASME International Mechanical Engineering Congress and Exposition (vol. 36339, pp. 243-251). (2002).

Iragorry, J., Tao, Y.X., Frost temperature relations for defrosting sensing system. J. Heat Transfer, 127(3), 344-351. (2005).

Byun, J.S., Jeon, C.D., Jung, J.H., Lee, J., The application of photo-coupler for frost detecting in an air-source heat pump. International Journal of Refrigeration, 29(2), 191-198. (2006).

Lawrence, J.M.W., Evans, J.A., Refrigerant flow instability as a means to predict the need for defrosting the evaporator in a retail display freezer cabinet. International journal of refrigeration, 31(1), 107-112. (2008).

Rainwater, J. H., Five defrost methods for commercial refrigeration. ASHRAE Journal, 51(3), 38-51. (2009).

Gao, Z., The Impact of thermostatic expansion valve heating on the performance of air-source heat pumps in heating mode. Energy conversion and management, 51(4), 732-739. (2010).

\* cited by examiner time=0 time=60 min time=120 min time=180 min

Measured capacitance during frosting and defrosting.

Measured capacitance during frost accumulation.

Capacitance during defrost initiation, melt water removal and surface drying.

Measured capacitance during frosting and defrosting.

Capacitance during defrost, melt water removal and surface drying

SENSOR ARRAY FOR SMART FROST DIAGNOSTICS

CROSS-REFERENCE TO RELATED APPLICATIONS

This application claims priority to U.S. Provisional Application 63/541,322 filed Sep. 29, 2023, entitled "SENSOR ARRAY FOR SMART FROST DIAGNOSTICS", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present document relates to frost sensors. More particularly, the present document concerns sensor arrays for smart frost diagnostics and defrosting control in systems such as heating, ventilation and air conditioning (HVAC) systems.

BACKGROUND

Frost accumulation on the evaporator surface of refrigeration and heat pump systems is a common heat and mass transfer process which substantially degrades the equipment performance. Once the heat and mass transfer of the evaporators in refrigeration or heat pump systems is below 0° C. (32° F.), water vapor in air typically condenses to form a deposit of tiny ice crystals upon the cold surfaces. The representative defrosting initiation and termination technologies are the time-based and/or temperature-based control strategies. The time-based and/or temperature-based defrosting initiation strategies have the advantages of simplicity and low-cost but lack precise defrosting initiation based on detecting frost accumulation accurately. This could leads to insufficient or excessive defrosting operations thus degrading the equipment efficiency.

Frost formation and growth depends on ambient air conditions. Air temperature, relative humidity (RH), and airflow rate directly impact frost density and growth rate. Frost formation and growth are also substantially related to the heat exchanger surface of the equipment, such as fin design (including coating treatment on fin surface), coil circuitry and system design. A wet heat transfer surface catalyzes frost formation and growth more than a dry heat transfer surface. Thus, is it is vital to dry the coil surface after defrosting. Unfortunately, it is difficult in commercial products to simultaneously achieve accurate defrost initiation by detecting frost thickness and defrost termination control by diagnosing surface conditions during defrosting.

Over several decades, much research was carried out to evaluate the effect of frost formation and to explore efficient defrosting technologies in refrigeration and heat pump systems. Representative defrosting methods are based on the off-cycle defrosting, in which the refrigerant flow to the evaporator is interrupted. For air-source heat pumps, the defrosting methods include compressor shutdown defrosting, electric heating defrosting, hot water spraying defrosting, hot gas bypass defrosting, reverse cycle defrosting. The compressor shutdown defrosting technology uses ambient air as the heat source of defrosting and is practical only to where ambient air temperature is above 1° C. Electric heating defrosting usually involves electrically heating up the surface of an outdoor coil to melt off frost and is limited in residential heat pump applications due to additional electrical energy required to melt frost. Hot water spraying defrosting and hot gas bypass defrosting are also very limited in real applications due to feasibility and safety. Reverse cycle defrosting has been the standard defrosting method for commercial air-source heat pumps for many decades. In reverse cycle defrosting mode, a regular operation cycle at heating mode for an air-source heat pump is reversed by using a four-way valve, and its outdoor coil acts as a condenser and its indoor coil as an evaporator so that hot gas is pumped into the outdoor coil to melt off the frost; when the frost is melted and drained away from the coil, the air-source heat pump returns to regular heating mode. Residential and commercial refrigeration systems also use similar defrosting methods; these include natural defrosting with the condensing unit off, hot gas defrosting, electric heating defrosting, and water defrosting. Unlike air-source heat pumps, electric heating defrosting is a common defrosting approach used in household refrigerators. There are also many other external heat source defrost methods (e.g. air jet defrosting, ultrasonic defrosting, and radiation-heating defrosting).

To improve system reliability and energy efficiency, defrosting technologies need accurate control strategies of defrosting initiation and termination. There are two categories of defrosting initiation controls: time-based defrosting initiation and demand-based defrosting initiation. In time-based defrosting initiation, defrosting is managed by a pre-set timer. For example, a defrosting operation in a heat pump is carried out every 60-90 mins of frosting time or a defrosting occurs in a household refrigerator after 8- to 12-hour regular cooling. Many of the earlier refrigeration and air-source heat pump systems adopted time-based defrosting initiation strategies because of the advantages of simplicity and low-cost. However, the performance of the equipment usually suffers insufficient defrosting operations thus degrading the performance efficiency. Thus, temperature and/or pressure parameters were introduced in the time-based defrosting initiation methods. When the temperature and/or pressure parameters hit pre-set values, the timer starts. Such temperature-enabled time-based defrosting initiation has been widely used in commercial refrigeration and heat pump systems currently available in the market.

Demand-based defrosting initiation is based on direct frosting detection and indirect frosting estimation. The technologies start a defrosting operation only if needed. The direct frosting detection technologies include: (1) measuring ice thickness using holographic interferometry technique, (2) measuring frost surface temperature by infrared thermometer, and (3) sensing frost using photo-coupler, photo-optical systems, or fiber-optic sensors. The indirect frosting estimation technologies include: (1) measuring air pressure differential across an evaporator, (2) sensing refrigerant flow instability using refrigerant superheat, (3) sensing the temperature difference between the air and evaporator surface, and (4) modeling the amount of frost on coil surface by applying neural. None of these strategies and technologies are able to successfully completely manage and control the defrosting process of refrigeration and heat pump systems. Current defrosting initiation operation results in unnecessary defrosting cycles when there is no or minimal frost accumulated on surface of outdoor coil, or leads to defrosting delay. Precise defrosting initiation based on detecting frost accumulation accurately is lacking.

Although the time-based control strategy of defrosting initiation is widely used, the defrosting operation is not always terminated based on time. In commercial refrigeration and heat pump systems, a defrosting operation can be terminated based on the tube or fin surface temperature of an outdoor coil, refrigerant pressure difference across an outdoor coil, or defrosting operation time. For example, in air-source heat pumps, the major method used for terminating a defrosting mode is based on the tube surface temperature of an outdoor coil. A temperature sensor is usually placed on the tube surface at the exit of the lowest liquid-line circuit of a multi-circuit outdoor coil. A defrosting operation will be terminated once a pre-set temperature is reached. However, there is no standard defrosting termination temperature due to the diversity of equipment and operating climates. Different defrosting termination temperature settings have been used and reported from 10° C. to 50° C. in public domain data. In practice, these defrosting controls are not capable of accurately identifying how much frost is melted and also ignore the coil surface condition which should be considered in the defrosting controls. If the coil surface remains wet, the residual melted water will catalyze frost growth and accelerate defrosting frequency when the refrigeration and heat pump systems return to regular operation. Thus, current defrosting operation leads to increasing defrosting frequency if melted water remains on the coil surface.

SUMMARY

The present document concerns a frost sensor. The frost sensor comprises: a substrate; and a plurality of sub-sensors disposed on the substrate and integrally formed to make a single sensor. The sub-sensors comprise: a first resistance-based sub-sensor formed of a first trace disposed on the substrate in a winding pattern and configured to measure a temperature; a capacitance-based sub-sensor formed of a second trace defining a first electrode and a third trace defining a second electrode; and a second resistance-based sub-sensor formed of a fourth trace defining a third electrode and a fifth trace defining a fourth electrode. The first and second electrodes comprise a plurality of interdigitated fingers or other interdigitated structures (including, but not limited to, round, spiral interdigitated electrodes, etc.) configured to detect a change in capacitance due of frost, ice or water present on a surface of the frost sensor. The second trace of the capacitance-based sub-sensor is integrally formed with the first trace of the first resistance-based sub-sensor. The third and fourth electrodes comprise a plurality of interdigitated fingers or other interdigitated structures configured to detect a change in resistance due to the frost, ice or water. The fourth trace of the second resistance-based sub-sensor is integrally formed with the third trace of the capacitance-based sub-sensor.

The frost sensor may comprise a flexible circuit and/or a processor. The processor may be configured to: determine defrosting initiation and termination based on at least a capacitance measurement of the capacitance-based sub-sensor assisted with on a temperature measurement of the first resistance-based sub-sensor and a resistance measurement of the second resistance-based sub-sensor. During the phase of frosting, the processor may be configured to: detect accumulated frost layer thickness based on at least a capacitance measurement of the capacitance-based sub-sensor. During the phase of defrosting, the processor may be configured to: detect frost melting, residual water and ice on the surface; detect whether a surface of the substrate is dry or wet based on at least a capacitance measurement of the capacitance-based sub-sensor; determine whether wetness of the surface of the substrate is from rain or humidity based on a temperature measurement of the first resistance-based sub-sensor; make an identification of water, ice or frost based on a temperature measurement of the first resistance-based sub-sensor and a capacitance measurement of the capacitance-based sub-sensor; and/or validate the identification of water, ice or frost based on a resistance measurement of the second resistance-based sub-sensor.

Additionally or alternatively, the processor may be configured to: cause an external device (e.g., a heating system or a refrigeration system) to start defrosting operations, responsive to the identification of sufficient frost accumulated or icing; identify defrost completion based on a detected pattern in capacitance measurements of the capacitance-based sub-sensor; and/or cause the external device to stop the defrosting operations, responsive to identification of defrost completion.

The present document also concerns a method for operating a frost sensor. The method comprises: coupling the frost sensor to an external object (wherein the frost sensor comprises a plurality of sub-sensors integrally formed to make a single piece); optionally allowing deformation of the frost sensor to conform to a curved surface of an external object without any damage to the substrate and plurality of sub-sensors; measuring a surface temperature of the external object using a first resistance-based sub-sensor of the plurality of sub-sensors that is defined by a first trace disposed on a substrate in a winding pattern; detecting a change in capacitance due of frost accumulation during frosting, and detecting residual frost, ice or melt water on the surface during defrosting using a capacitance-based sub-sensor of the plurality of sub-sensors that is formed of a second trace defining a first electrode and a third trace defining a second electrode (wherein (i) the first and second electrodes comprise a plurality of interdigitated fingers or other interdigitated structures and (ii) the second trace is integrally formed with the first trace of the first resistance-based sub-sensor); and detecting a change in resistance due to frost accumulation during frosting and residual frost, ice or melting water on the surface during defrosting using a second resistance-based sub-sensor of the plurality of sub-sensors that is formed of a fourth trace defining a third electrode and a fifth trace defining a fourth electrode (wherein (i) the third and fourth electrodes comprise a plurality of interdigitated fingers or other interdigitated structures and (ii) the fourth trace is integrally formed with the third trace of the capacitance-based sub-sensor).

The methods may also comprise: detecting whether a surface of the substrate is dry or wet based on at least a capacitance measurement of the capacitance-based sub-sensor; determining whether wetness of the surface of the substrate is from rain or humidity based on a temperature measurement of the first resistance-based sub-sensor; making an identification of water, ice or frost based on a temperature measurement of the first resistance-based sub-sensor and a capacitance measurement of the capacitance-based sub-sensor; and/or validating the identification of water, ice or frost based on a resistance measurement of the second resistance-based sub-sensor.

The methods may further comprise: causing an external device (e.g., a heating system or a refrigeration system) to start defrosting operations performing operations, responsive to the identification of ice or frost; identifying defrost completion based on a detected pattern in capacitance measurements of the capacitance-based sub-sensor; and/or causing the external device to stop the defrosting operations, responsive to identification of defrost completion.

BRIEF DESCRIPTION OF THE DRAWINGS

The present solution will be described with reference to the following drawing figures, in which like numerals represent like items throughout the figures.

DETAILED DESCRIPTION

Accurate defrosting initiation and termination usually requires not only the accurate detection of frost accumulation during frosting, but also requires knowledge of frost melting and surface dryness during defrosting. Therefore, the present solution provides a smart frost sensor technology to facilitate, for example, HVAC frost diagnostics and defrosting control. The smart frost sensor utilizes integrated measurement of capacitance, resistance and temperature sensing to dynamically detect frost growth during the period of frosting, detect residual frost, melting water and ice during defrosting operations, and identify the heat transfer surface wettability and dryness during defrosting operations. This approach enables accurate frosting and defrosting control in real refrigeration and heat pump systems, resulting in a substantial improvement in energy efficiency.

The present solution adopts an innovative integration of the measurement of capacitance, resistance and temperature sensing to dynamically detect frost growth during the period of frosting, detect residual frost, melting water and ice on the surface during defrosting operations, and identify heat transfer surface dryness/wettability during the period of defrosting. The smart frost sensor consists of three sub-sensors: (a) a resistance-based sub-sensor for temperature measurement, (b) a capacitance-based sub-sensor for frost/ice/water measurement and surface wettability identification, and (c) a resistance-based sub-sensor for enhanced frost/ice/water measurement and surface wettability identification. The integrated sensor array could be fabricated on a silicon wafer substrate, a polyimide substrate, or other substrates.

The present solution has many benefits. For example, the present solution provides precise defrosting initiation based on accurate detection of frost accumulation. The present solution is designed to assist in determining smart defrosting termination. The present solution enables accurate frosting and defrosting control in real refrigeration and heat pump systems resulting in a substantial improvement in energy efficiency.

The present solution has many commercial applications. The disclosed technologies can be used generally in fields such as energy, utilities, detectors and/or sensors. The disclosed technologies can be used in residential and commercial refrigeration systems, various heat pumps, airplanes, vehicles, and/or transportation infrastructures.

Electrical Properties of Frost, Water, Ice and Air

Figure 1:
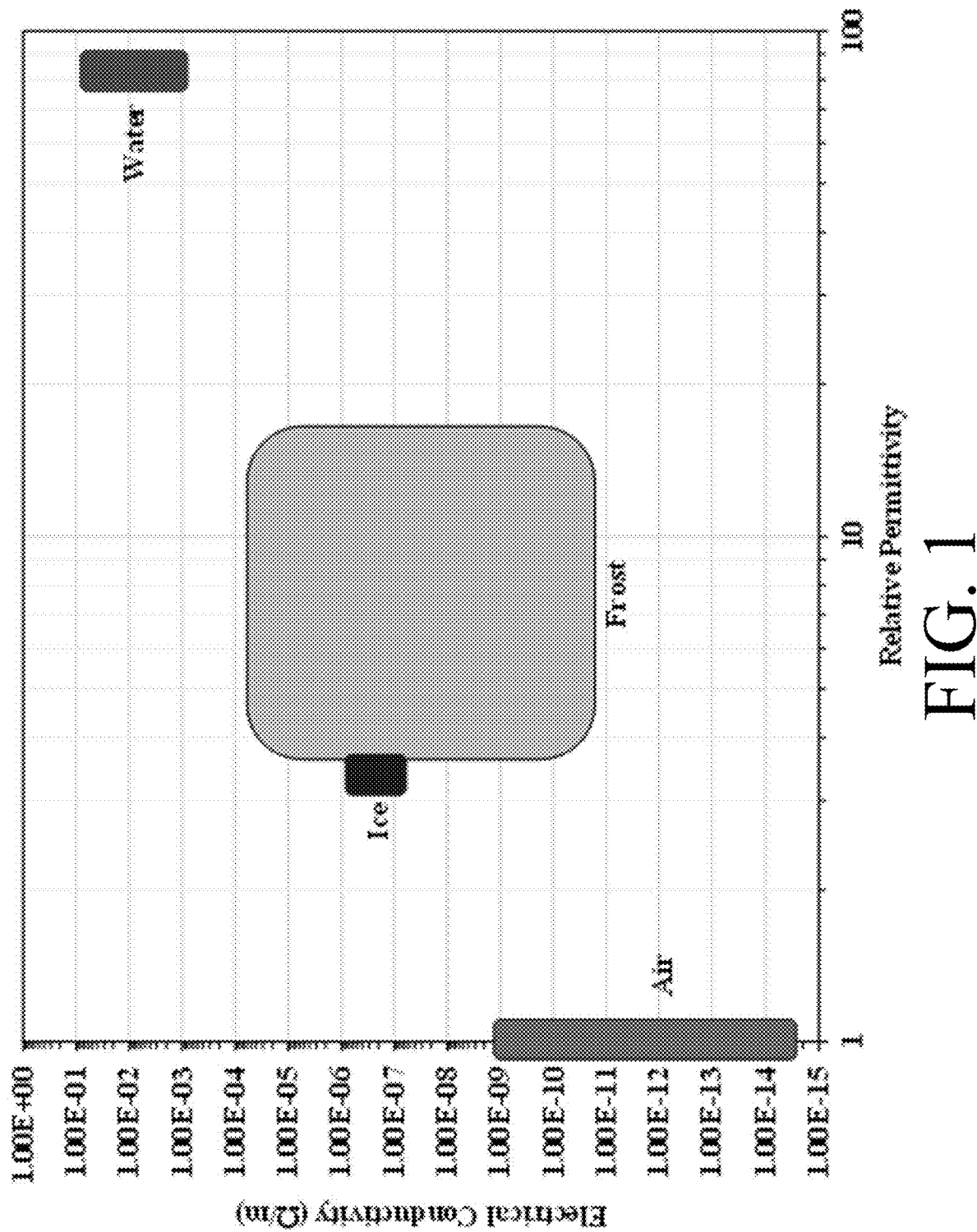
FIG. 1 provides a graph showing a comparison of the electrical conductivity and relative permittivity of water, ice and frost.

Frost is a mixture of ice and air (including water vapor), which results in complex dynamic processes in frosting and defrosting. Consequently, frost formation changes with various conditions of air humidity, temperature, airflow rate, surface temperature and dryness/wettability. Defrosting becomes even more complex and involves a mixture of water, ice and frost. Although water, ice and frost are all composed of $H_2O$ and a small amount of other constituent impurities except that there is a certain amount of air in the frost, their electrical properties are different. FIG. 1 compares their electrical conductivity and relative permittivity. Here, the frost data is estimated based on snow data because of limited data of frost in public domain and the similarity between frost and snow. Compared to water, ice and air, the frost electrical properties vary widely because frost is a mixture of ice and air (including water vapor) and its density is a dynamic parameter varying with time, frost layer thickness and other conditions. However, the difference of electrical conductivity and relative permittivity shown in below TABLE 1 demonstrates that there is a significant potential opportunity to measure their resistance and capacitance to identify the difference among frost/ice, air and water. This is important in frosting and defrosting control. The smart frost sensor of the present solution is designed based on integrated measurement of capacitance, resistance and temperature sensing to dynamically detect frost growth during the period of frosting, detect residual frost, melting water and ice on the surface during defrosting, and identify the heat transfer surface dryness/wettability during defrosting.

TABLE 1

Electrical conductivity and relative permittivity of water, frost, ice and air.

| | Water[1] | Frost[2] | Ice[3, 4, 5] | Air |
|---|---|---|---|---|
| Electrical conductivity (Ω/m) | 1e–3~5e–2 | 3e–11~3e–5 | 1e–7~4e–8 | 3e–15~1e–9 |
| Relative permittivity | 80-88 (0-20 C.) | 4~15 | 35~45[5] | 1 |

[1]estimated based on drinking water;
[2]estimated based on snow;
[3]measurement frequency >1e5;
[4]if measurement frequency <1e3, ice relative permittivity is ~80-120; ice relative permittivity is ~45 at optimal measurement frequency = 1e4.

The smart frost sensor of the present solution adopts an innovative integration of the measurement of capacitance, resistance and temperature sensing to dynamically detect frost growth during the period of frosting, detect residual frost, melting water and ice on the surface during defrosting, and identify heat transfer surface dryness/wettability during defrosting. The approach will enable accurate frosting and defrosting control in real refrigeration and heat pump systems, improving energy efficiency substantially.

Figure 2:
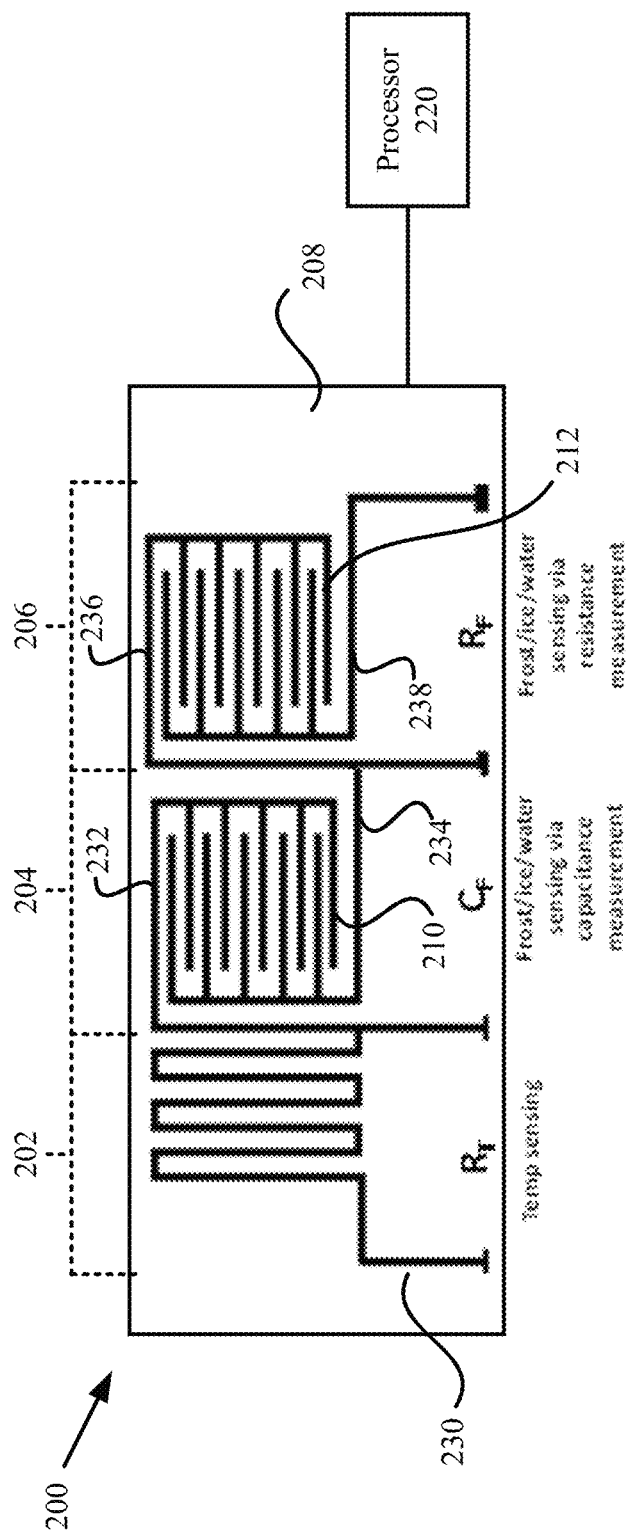
FIG. 2 provides a circuit diagram of a smart frost sensor.

FIG. 2 shows a circuit diagram of a smart frost sensor 200. Smart frost sensor 200 may comprise a flexible circuit. Smart frost sensor 200 implements a capacitive sensing technique to detect and quantify frost accumulation on the substrate surface. The measured frequencies used in the capacitive sensing technique covers 3000 Hz-20000 Hz with optimal around 5000-10000 Hz, depending on the circuits designed. Smart frost sensor 200 is configured to facilitate operations of a processor 220 for determining whether the substrate surface is wet or dry via concurrent measurements of temperature and capacitance. The smart frost sensor 200 can further make an identification of water, ice and frost on the substrate surface via concurrent measurements of temperature, capacitance and resistance. The identification of water, ice and frost can be made using the temperature measurement and the capacitive measurement. The resistance measurement may be used to validate the accuracy of the water, ice or frost identification. The temperature measurement also allows the processor 220 to make a determination as to whether the identified water is due to melting water, ambient moisture or rain.

Accordingly, smart frost sensor 200 comprises of three sub-sensors 202, 204 and 206 which are integrally formed with each other. Sub-sensor 202 comprises a resistance-based sub-sensor for temperature measurement $R_T$. Sub-sensor 204 comprises a capacitance-based sub-sensor for frost/ice/water capacitance measurement $C_F$ and surface wettability identification. The capacitance-based sub-sensor in structures include, but not limited to, rectangular, round, and spiral interdigitated electrodes, etc. Sub-sensor 206 comprises a resistance-based sub-sensor for enhanced frost/ice/water measurement $R_F$ and surface wettability identification. The integrated sensor array 202-206 may be fabricated on a substrate 208. Substrate 208 can include, but is not limited to, a silicon wafer substrate, a polyimide substrate, or other substrate. This combination in conjunction with machine learning further enhances the identification of frost, water and ice under the conditions of complex frost and defrosting.

In FIG. 2, the resistance-based sub-sensor 202 may be fabricated by using the methods of laser directed writing or aerosol jet printing or metal lift-off methods like photolithography technique. As a resistive temperature detector, it is based on resistance change observed with varying temperature. The resistive temperature sensing method enables high accuracy, short response time, small volume, and simple fabrication.

The capacitance-based sub-sensor 204 adopts interdigitated comb electrodes or other interdigitated structures (including, but not limited to, round, spiral interdigitated electrodes, etc.) 210. The sensor capacitance is substantially related to the relative permittivity of the working medium covered over the sensor, but also depends on the electrodes structure, geometrical configuration and dimensions. In some scenarios, the interdigitated pattern of electrodes may have a finger length of 10-20 mm, a finger width of 0.5-3 mm, finger gap distance of 0.1-1 mm, and a finger layer thickness of 10-100 mm. The present solution is not limited to the particulars of this example. The thin interdigitated layer of material could be copper or gold deposited by metal lift-off method on appropriate substrate, or could be carbon-based porous structure formed by using a laser directed writing method, or could use extrusion to print the capacitance sensor. A thin insulation layer of $SiO_2$ (i.e. 0.5 mm) may also be deposited on the top of the interdigitated layer.

In addition, the integrated sensor 200 has a third sub-sensor which also adopts an interdigital electrode configuration with interdigitated electrodes other interdigitated structures (including, but not limited to, round, spiral interdigitated electrodes, etc.) 212. The third sub-sensor 206 is employed as a resistance-based sub-sensor to measure the resistance of frost/ice/water thus enhancing frost/ice/water measurement and surface dryness/wettability identification. Compared to frost, ice and air, water has higher relative permittivity. This can help assisting the sensor in identifying the phenomenon of frost or ice melting to water, water removal and heat transfer surface dryness/wettability during the defrosting situation. Thus, the comprehensive design of the present solution is able to achieve smart sensing and accurate frosting and defrosting control.

Operations of processor 220 will now be described in more detail. Processor 220 is configured to obtain measurement values $R_T$, $C_F$ and $R_F$ based on signals received from the smart frost sensor 200. $R_T$, $C_F$ and $R_F$ measurement depends on sensor configurations and geometry size, as well as the amount or layer thickness of frost/ice/water on the surface. The $R_T$, $C_F$ and $R_F$ measurement of three sub-sensors are cauterized, respectively, and their performance maps are embedded in the Processor. As an example, but not limited to, shown in the below TABLE 2, the measured capacitance value $C_F$ indicates whether there is air, water, ice or frost on the surface of substrate 208. The measured capacitance value for air CE-air may be between 0-14 pF at any measured temperature value $R_T$. The measured capacitance value for water $C_{F\text{-}water}$ may be greater than 400 pF. The measured capacitance value for ice $C_{F\text{-}ice}$ may be 40-50 pF. The measured capacitance value for frost $C_{F\text{-}frost}$ may be 15-40 pF. The measured resistance value for air $R_{F\text{-}air}$ is relatively large. The measured resistance value for water $R_{F\text{-}water}$ is relatively low. The measured resistance value for ice $R_{F\text{-}ice}$ falls between $R_{F\text{-}air}$ and $R_{F\text{-}water}$. The measured resistance value for frost $R_{F\text{-}frost}$ falls between $R_{F\text{-}air}$ and $R_{F\text{-}ice}$.

TABLE 2

| | Air | Water | Ice | Frost/Ice |
|---|---|---|---|---|
| $R_T$ | Any | >32° F. | ≤32° F. | ≤32° F. |
| $C_F$ | 0-14 pF | >400 pF | 40-50 pF | 15-50 pF |
| $R_F$ | $R_{F\text{-}air}$ | $R_{F\text{-}water}$ | $R_{F\text{-}water} < R_{F\text{-}ice} < R_{F\text{-}air}$ | $R_{F\text{-}water} < R_{F\text{-}frost} < R_{F\text{-}air}$ |

Thus, during operations, the processor 220 can use the $R_T$ and $C_F$ values in the maps to (i) determine how thickness frost/ice is accumulated on the heat transfer surface; (ii) determine when defrosting initiates, (iii) detect residual frost/ice, melting water, and water removal after the initiation of defrosting, (iv) determine whether the substrate surface is wet, and (v) determining when defrosting terminates. For example, processor 220 can detect frost layer growth when $C_F$ is used to measure frost thickness during frosting. Processor 220 can determine that defrost is required if frost thickness measured using $C_F$ has a value greater than the setting frost thickness point. During the defrosting, the processor 220 can detect the phenomenon of frost or ice melting to water, water removal, and identifying the surface dryness and wetness. The processor 220 can determine the surface dryness and wetness by identifying water, ice or frost on the substrate surface. For example, but not limited to, water is identified when the value of $R_T$ is greater then freezing temperature (e.g., 32° F.) and the value of $C_F$ is greater than >400 pF. Frost and ice are detected when $R_T$ is equal to or less than the freezing temperature (e.g., 32° F.) and the value of $C_F$ is 15-40 pF. The identification of water can be validated or considered accurate when the value of $R_F$ is equal to $R_{F\text{-}water}$. The identification of frost and ice can be validated or considered accurate when the value of $R_F$ is equal to $R_{F\text{-}frost}$ (which is between $R_{F\text{-}air}$ and $R_{F\text{-}water}$. The present solution is not limited to the particulars of this example.

The processor can perform other operations to determine whether the water is from melting frostice, rain or humidity. For example, if the temperature value $R_T$ is below the freezing temperature (e.g., 32° F.), then the processor 220 can determine that the water is from melting frost/ice. In contrast, the processor 220 can determine that the water is from rain or humidity when the temperature value $R_T$ is above the freezing temperature (e.g., 32° F.). The present solution is not limited to the particulars of this example.

The decisions made by processor 220 can be used to control defrosting operations of an HVAC system, refrigeration system or other system. The manner in which such control can be achieved will be discussed in detail below.

Figure 3:
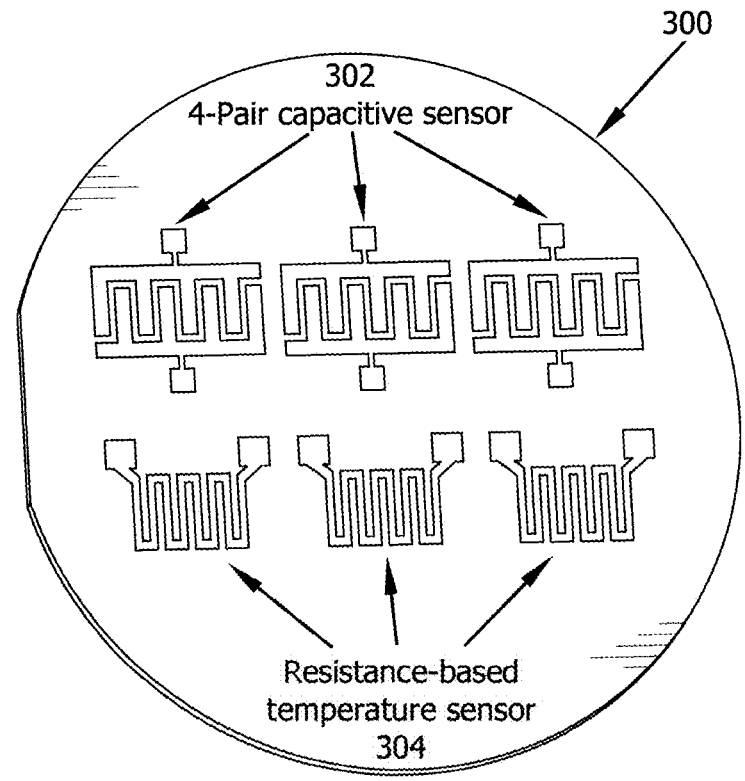
FIG. 3 shows smart frost sensors which were fabricated using a photolithography technique.
Figure 3:
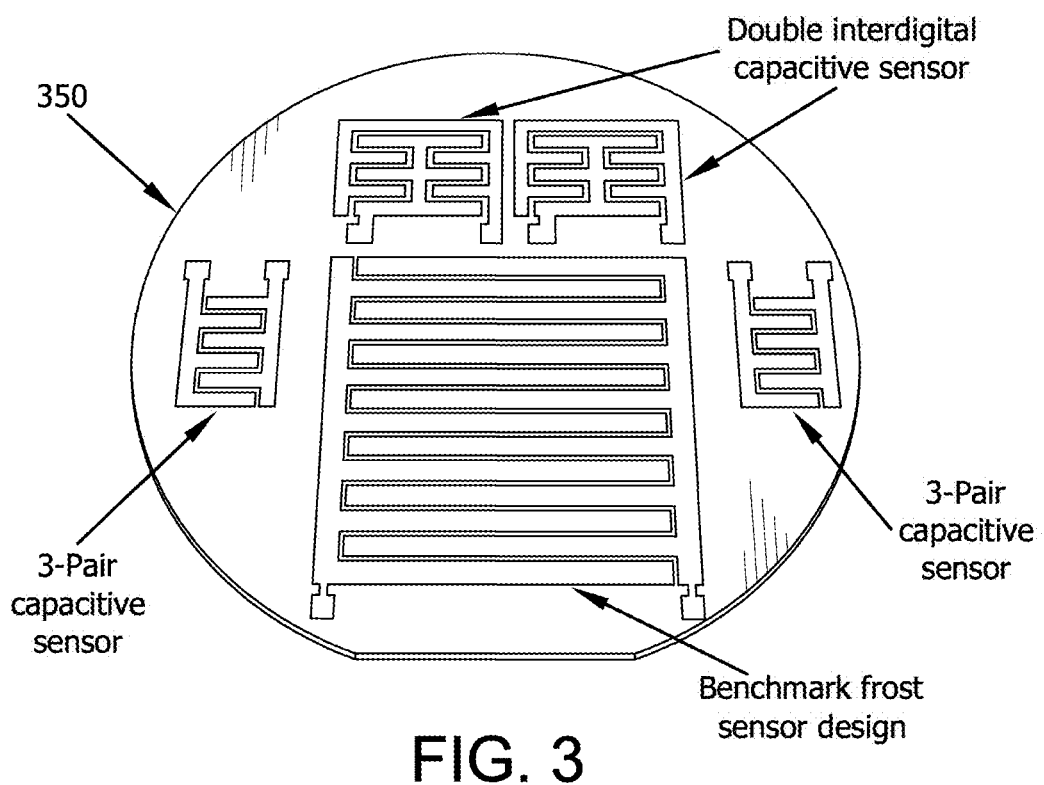

FIG. 3 shows smart frost sensors 300, 350 which were fabricated using a photolithography technique. The photolithography technique involves: (1) coating a 10 nm adhesion layer of Ti on a silica wafer; and (2) coating a 100 nm Au layer. The two-step coating process is employed since gold does not stick/adhere to inorganic materials such as silica wafer. For the 4-pair capacitive sensor 302, 0.318 mg of Au was used, which costs 1.79 cents. For the resistance-based temperature sensor 304, 0.168 mg of Au was used, which costs 0.95 cents. Thus, the material cost of the sensors is very low. In particular, the sensor configurations are very simple and further reduce manufacturing costs.

Figure 4:
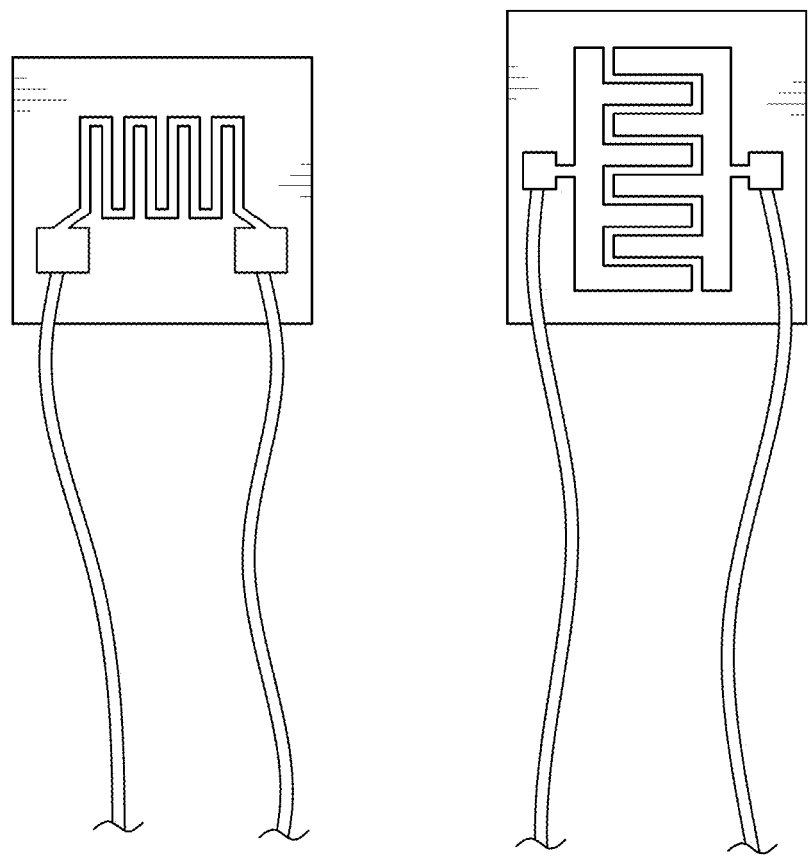
FIG. 4 provides an image of a 4-pair capacitive sensor and resistance-based temperature sensor with wire soldering.
Figure 5:
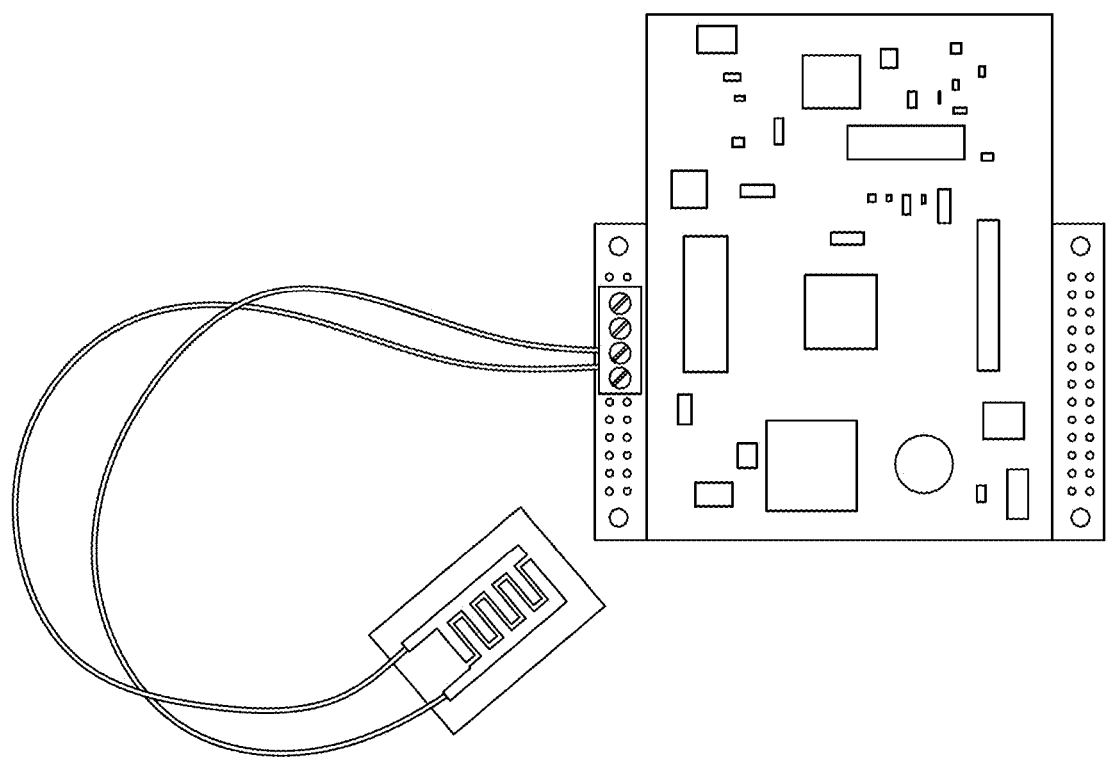
FIG. 5 provides an image of electronics for a frost sensor.

FIG. 4 shows the 4-pair capacitive sensor and resistance-based temperature sensor with wire soldering. Moreover, appropriate low-cost electronics were developed to elevate the sensor TRL. FIG. 5 shows the electronics with a frost sensor. Low-cost capacitive sensors were also fabricated using a low-cost extrusion printing technology.

Figure 6:
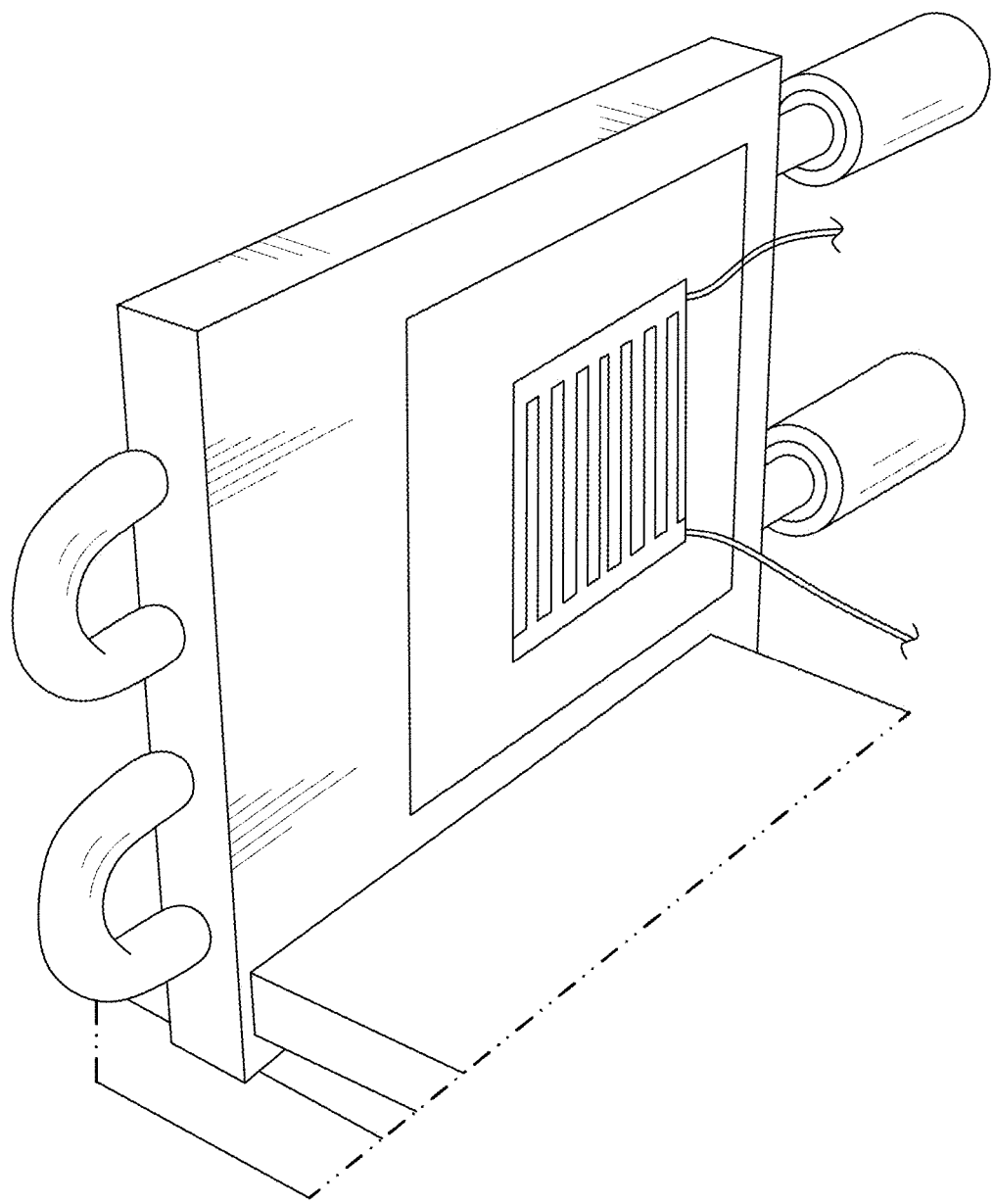
FIG. 6 provides an image showing a frost sensor testing module.

The frost sensor was tested on an updated frost/defrost testbed shown in FIG. 6. A nm-level lay of hydrophobic material was coated on the designed frost sensor. The frosting/defrosting testbed was also updated to simulate real heat transfer surfaces of HVAC device, allowing for frosting, defrosting and rapid removal of melt water during defrosting.

Figure 7A:
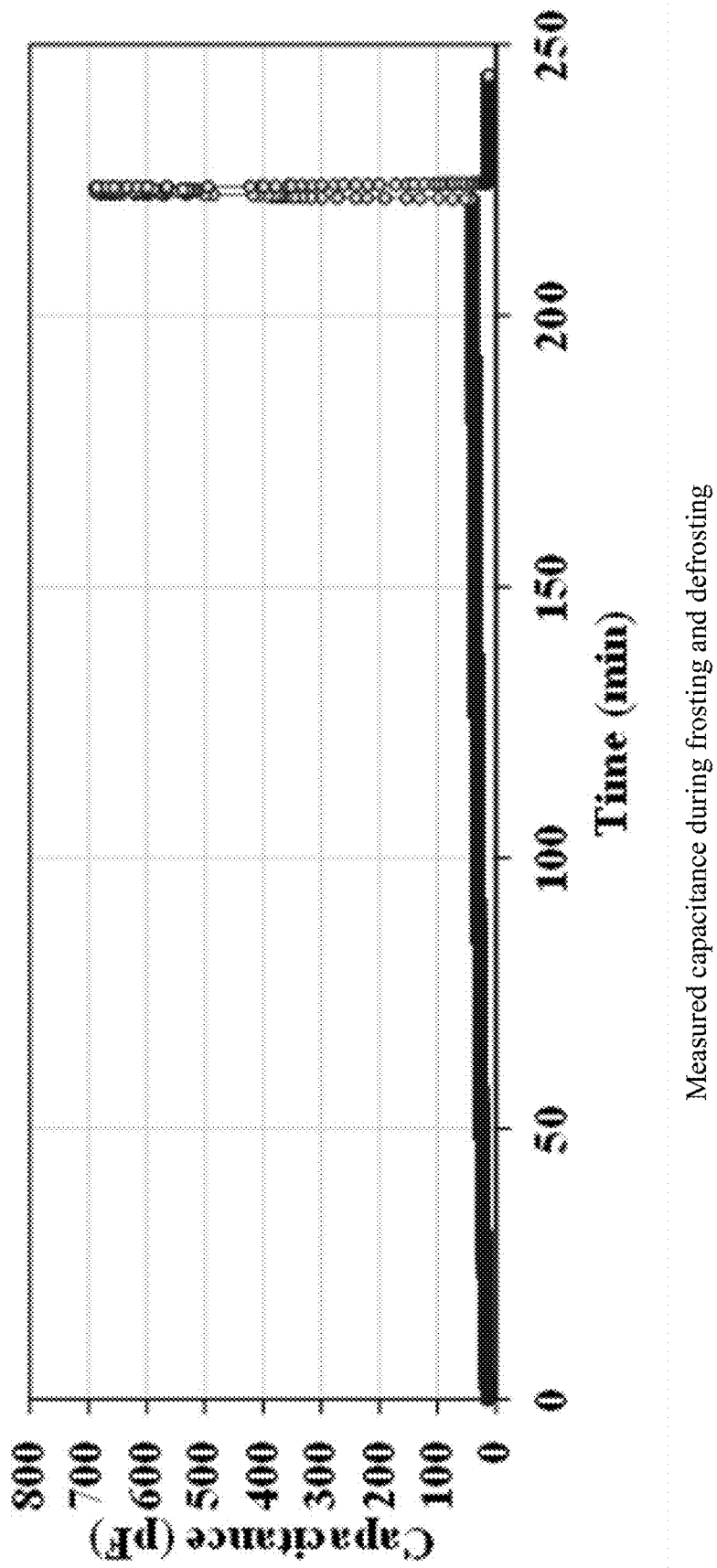
FIGS. 7A-7C (collectively referred to herein as "FIG. 7") provide graphs showing (A) measured capacitance during frosting and defrosting, (B) a phase of frosting, and (C) defrost, melt water removal and surface drying. Test conditions: air at 6.3 C/75RH %. The coolant temperature entering the testbed is −19° C.
Figure 7B:
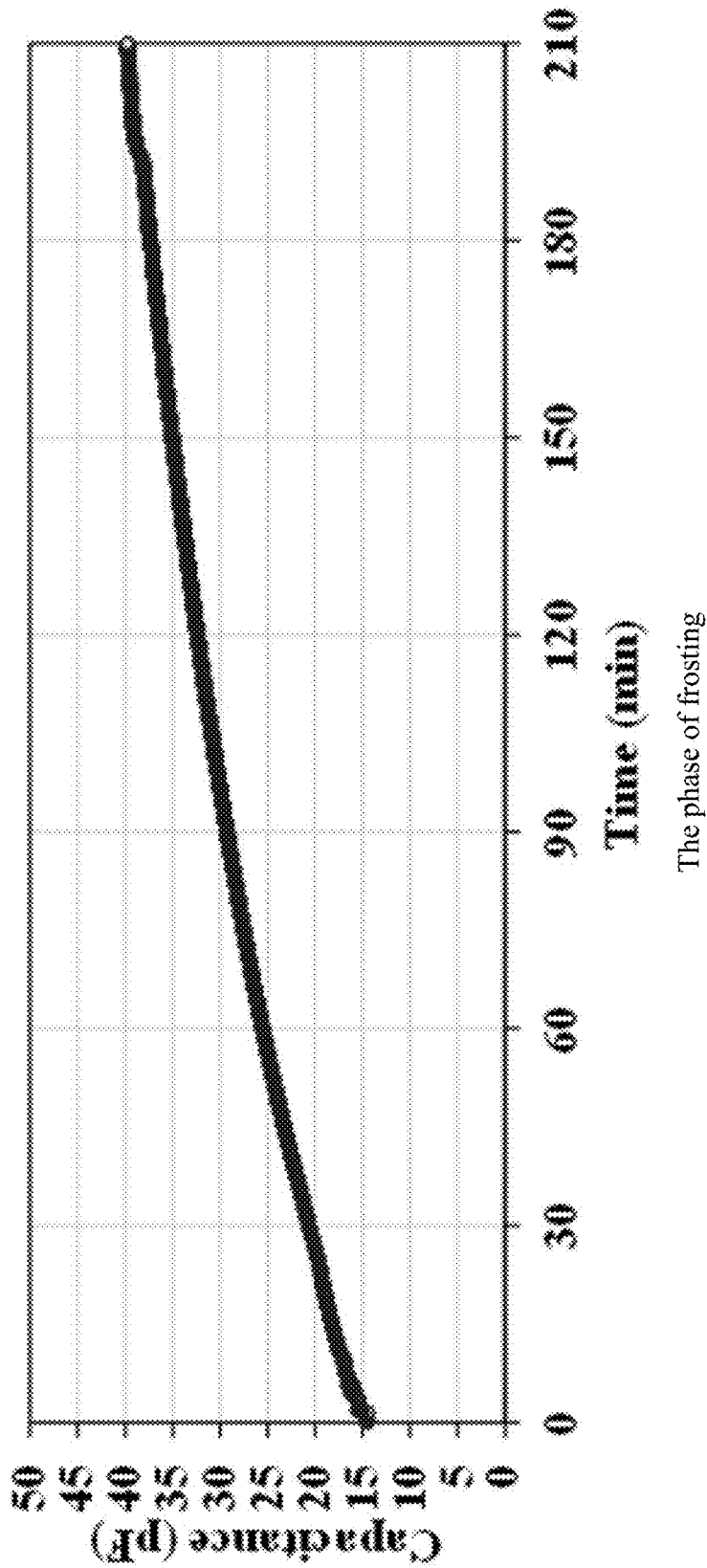
Figure 8:
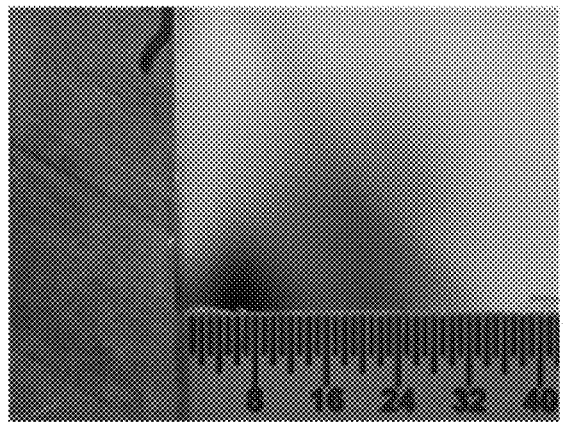
FIG. 8 provides images showing frost accumulation as a function of time. Test conditions: air at 6.3 C/75RH %. The coolant temperature entering the testbed is −19° C.
Figure 8:
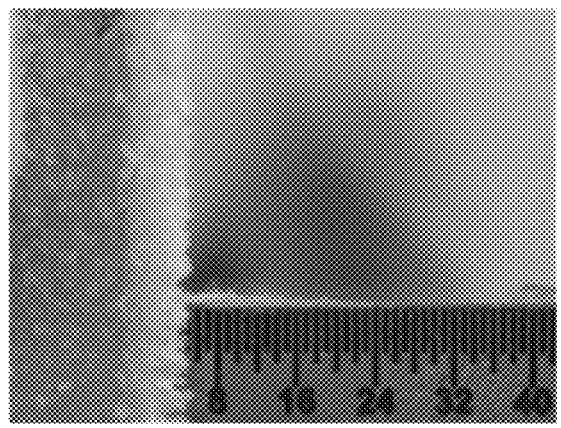
Figure 8:
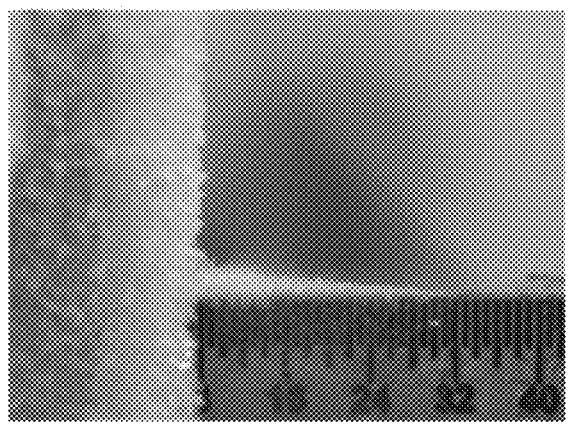
Figure 8:
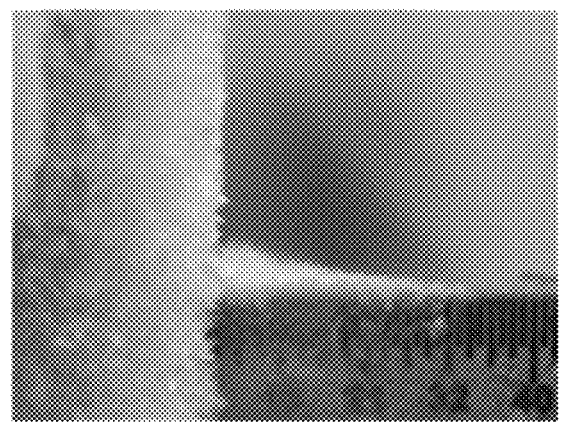
Figure 9:
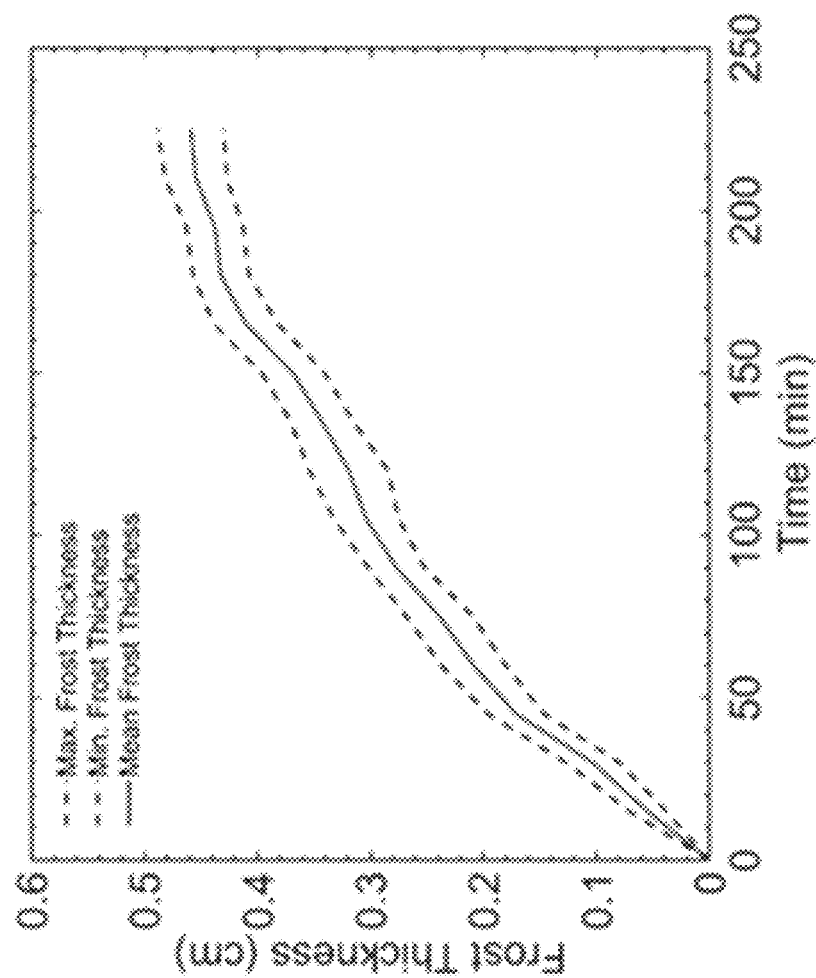
FIG. 9 shows frost growth as a function of time in the case of FIG. 8. Test conditions: air at 6.3 C/75RH %. The coolant temperature entering the testbed is −19° C.

The current sensor design is able to detect frost accumulation in excess of 4-10 mm. FIGS. 7-8 provide graphs and images showing that at around 3.5 hours, the amount of frost has increased by around 4 mm. The measured capacitance increases monotonically with increasing defrost. FIG. 9 shows the frost accumulation in the testing of around 3.5 hours.

Figure 7C:
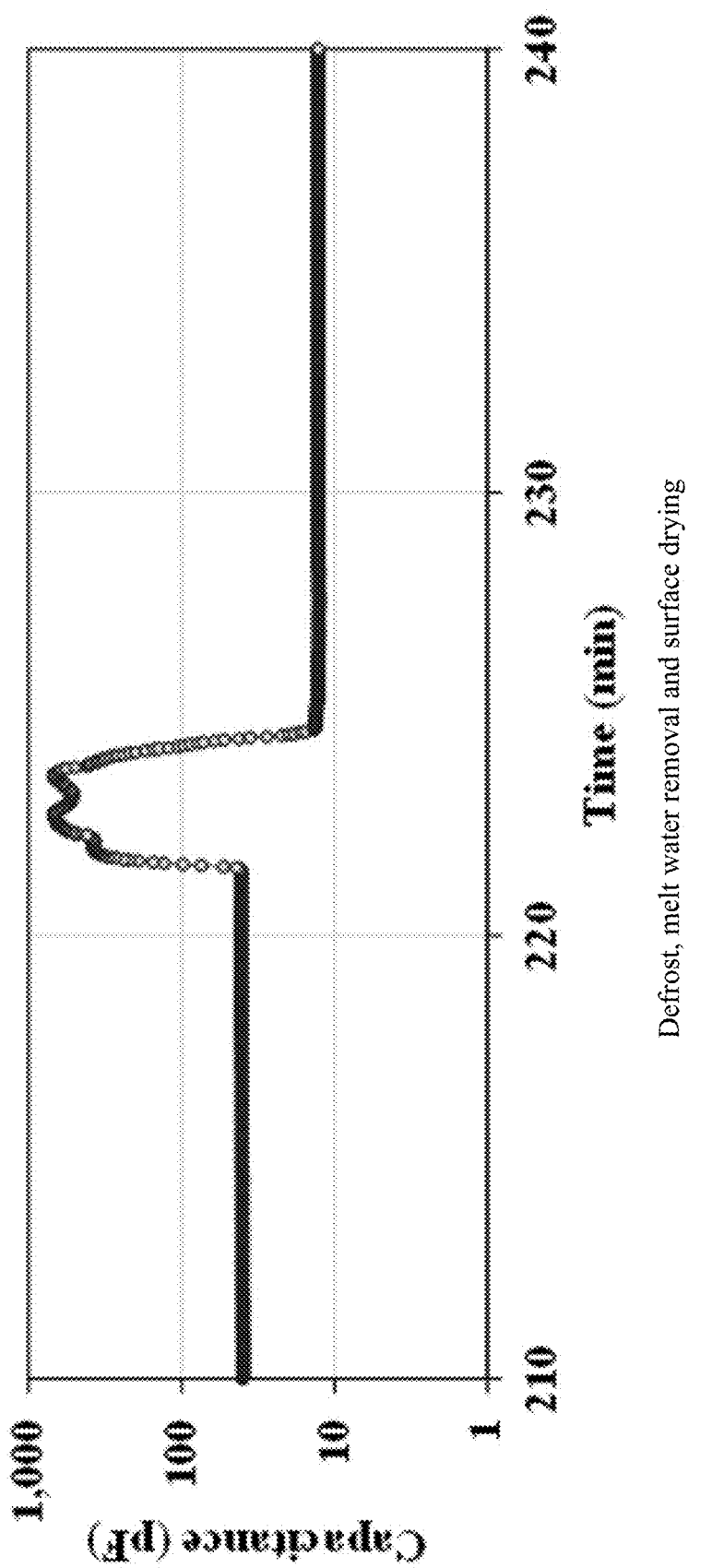
Figure 10:
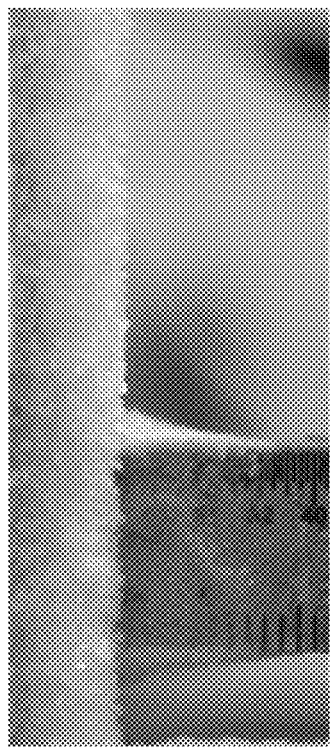
FIG. 10 illustrate an entire process of defrost, melt water removal and surface drying. Test conditions: air at 6.3 C/75RH %. The coolant temperature entering the testbed is −19° C.
Figure 10:
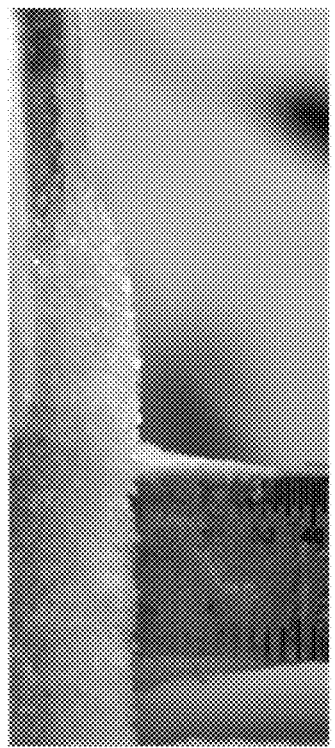
Figure 10:
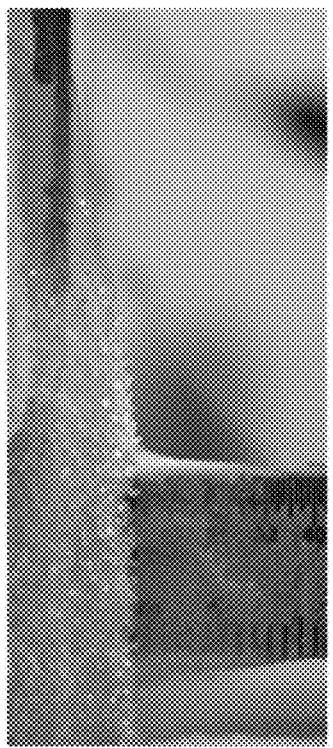
Figure 10:
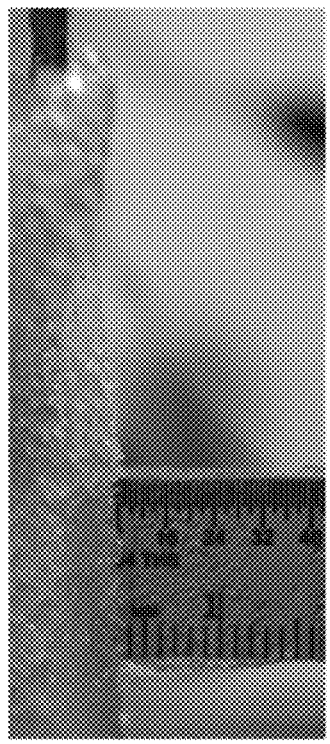
Figure 10:
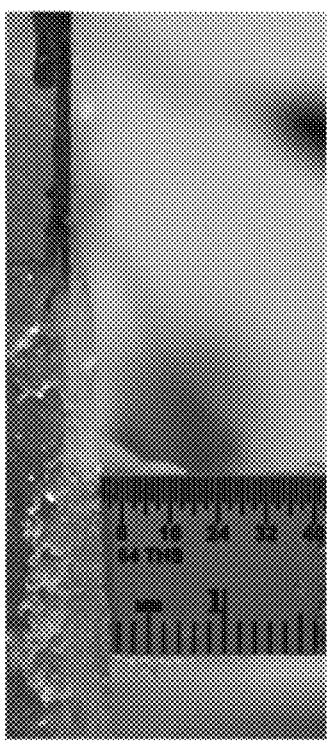
Figure 10:
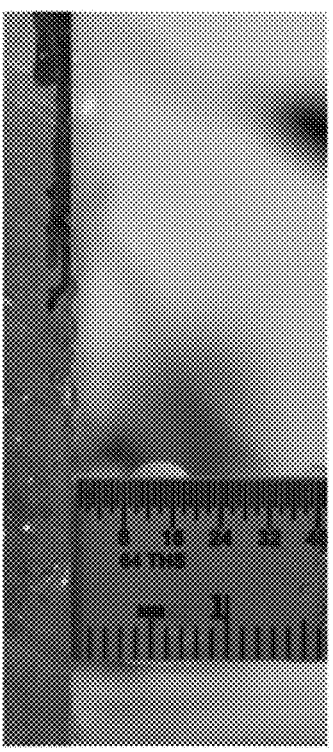
Figure 11A:
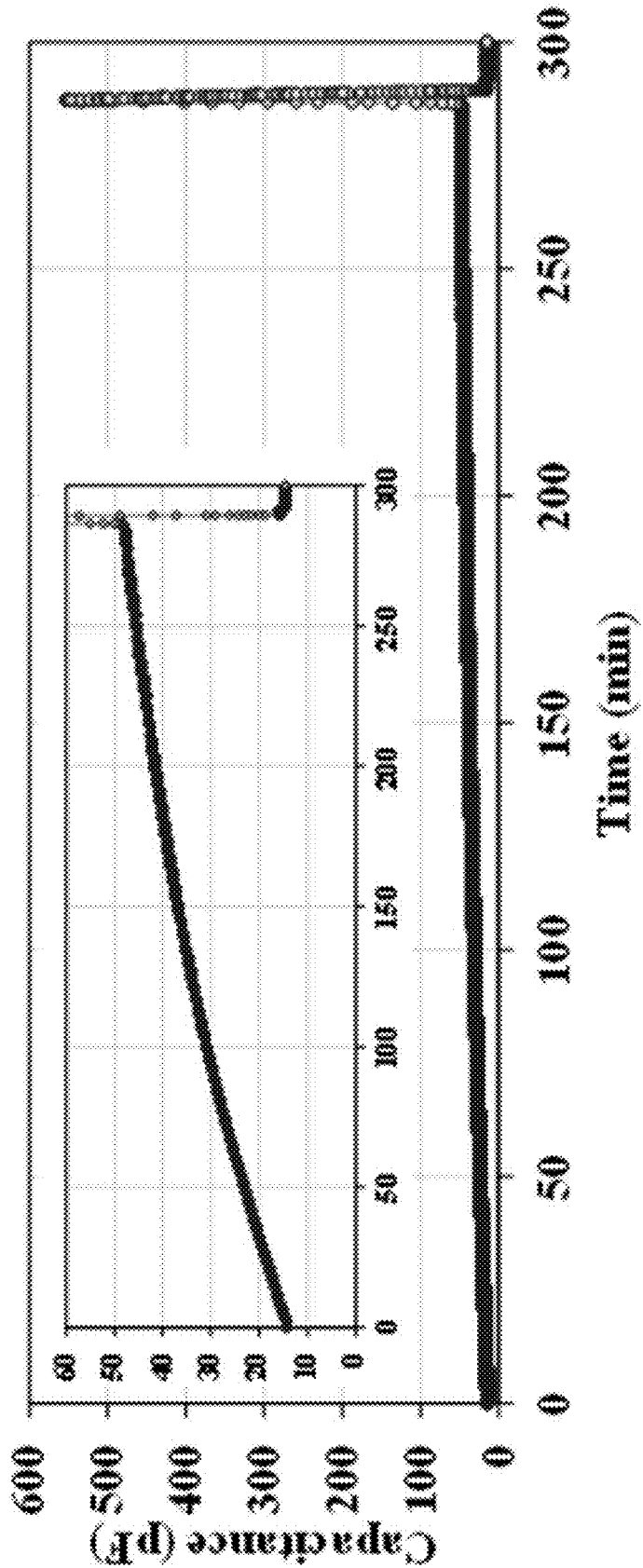
FIGS. 11A-11C (collectively referred to herein as "FIG. 11") provide graphs showing (A) measured capacitance during frosting and defrosting, (B) measured capacitance during frost accumulation, and (C) capacitance during frosting and defrosting, melt water removal and surface drying. Test conditions: air at 3.8 C/80RH %. The coolant temperature entering the testbed is −16° C.
Figure 11B:
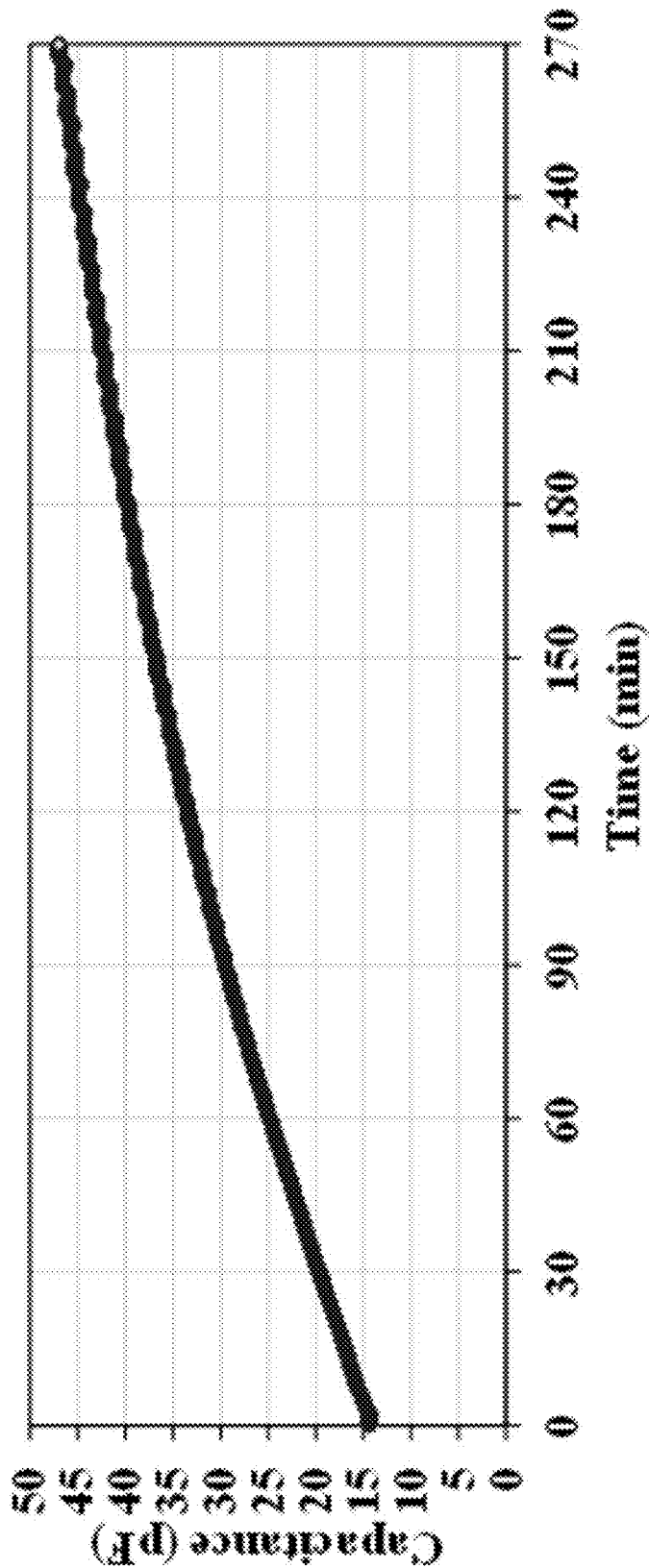
Figure 11C:
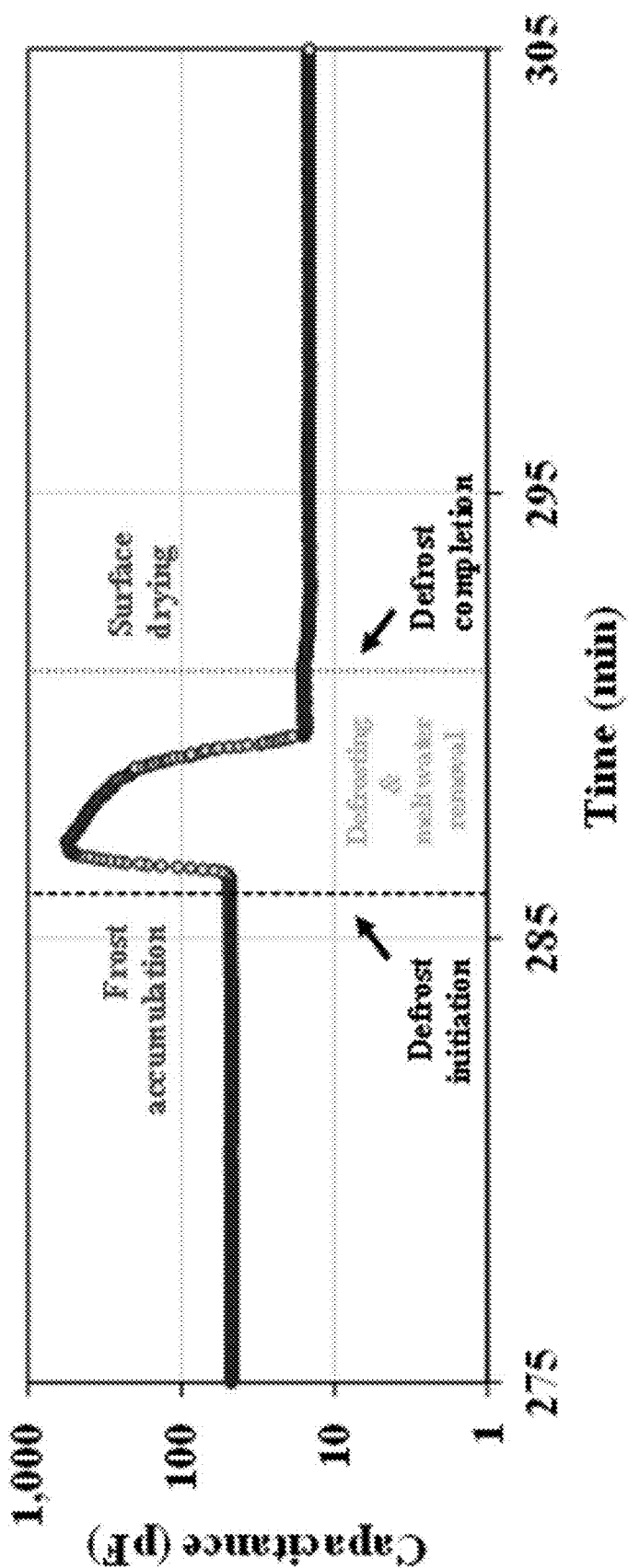
Figure 12:
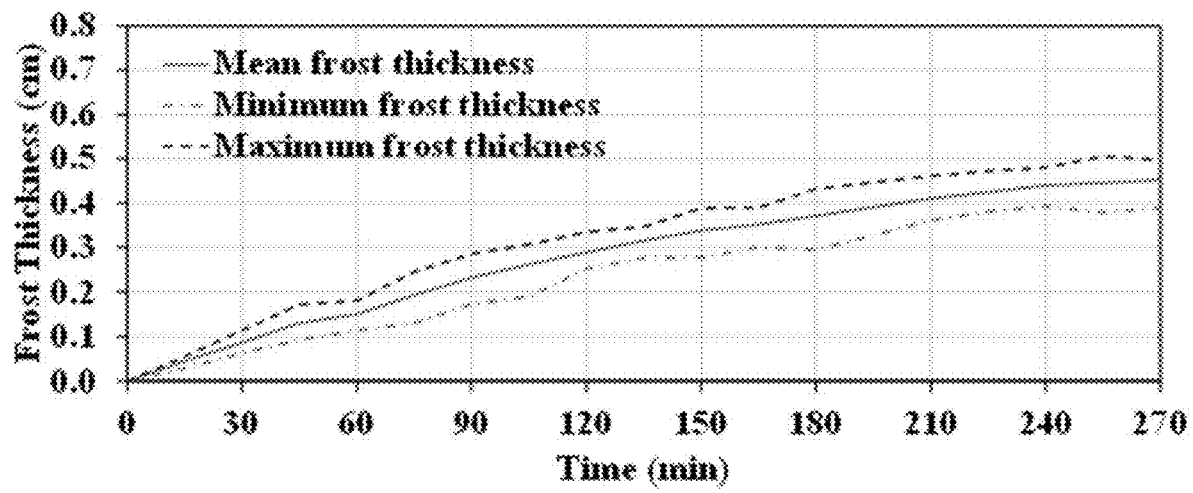
FIG. 12 provides graphs plotting frost thickness verse capacitance during a frost accumulation under test conditions: 3.8 C/80RH %.
Figure 12:
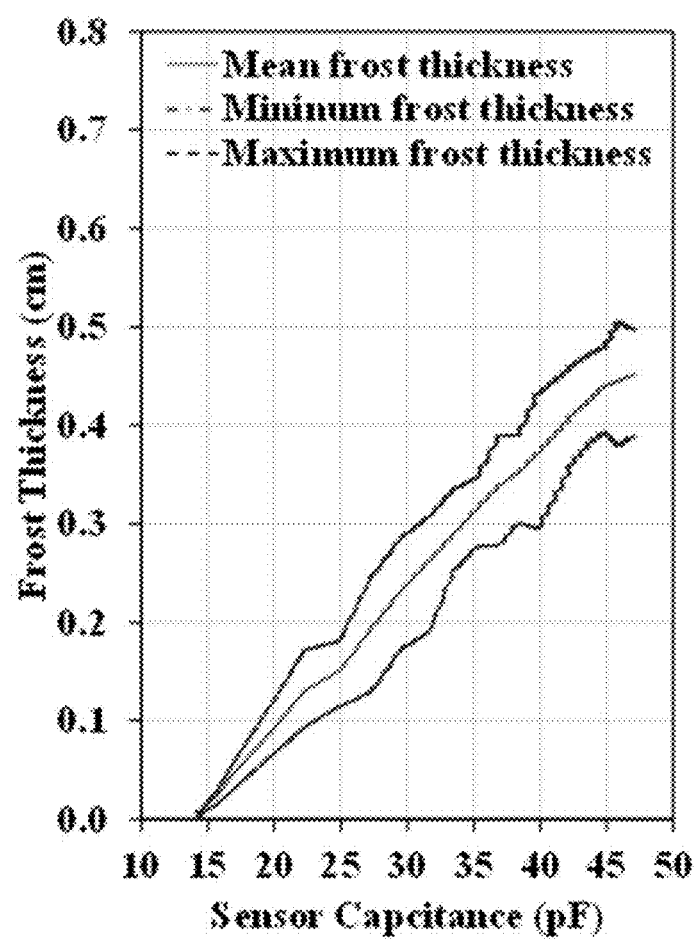
Figure 13A:
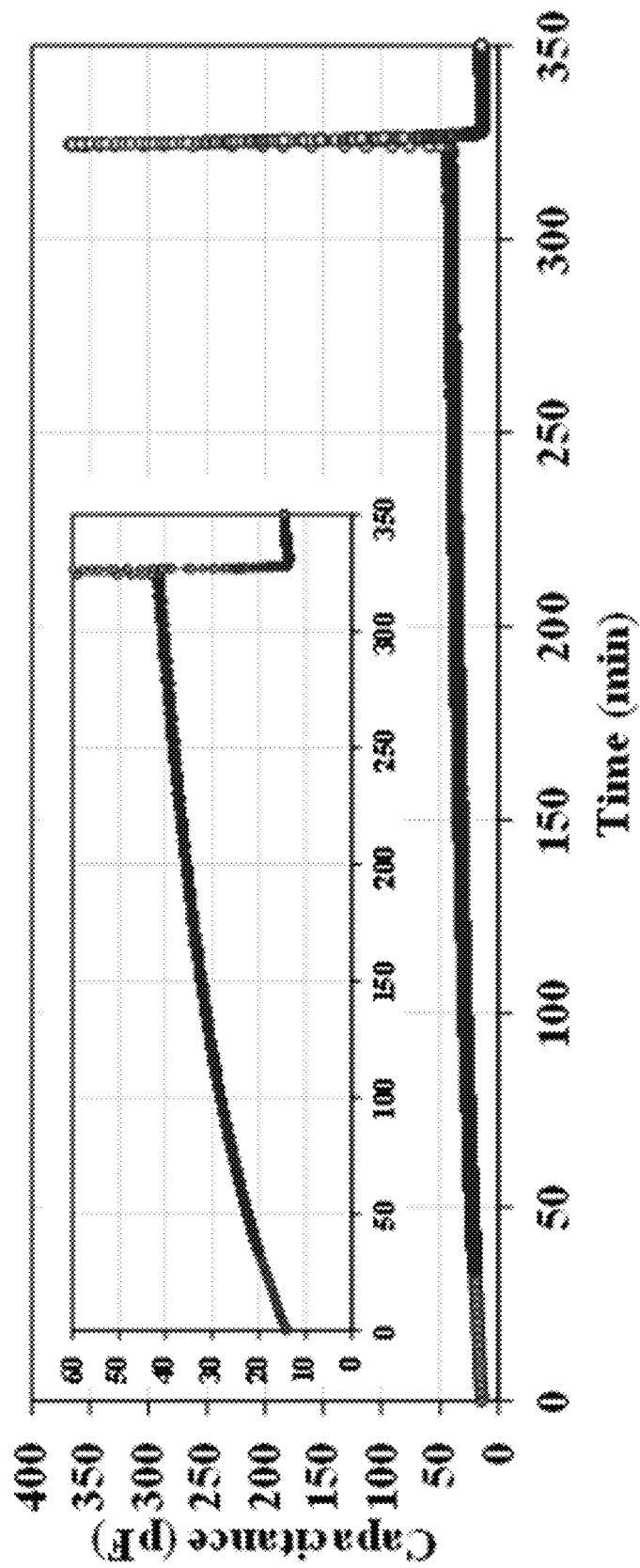
FIGS. 13A-13C (collectively referred to herein as "FIG. 13") provides graphs showing a measured capacitance during frosting and defrosting. Test conditions: 3.8 C/85RH %. The coolant temperature entering the testbed is −16° C.
Figure 13B:
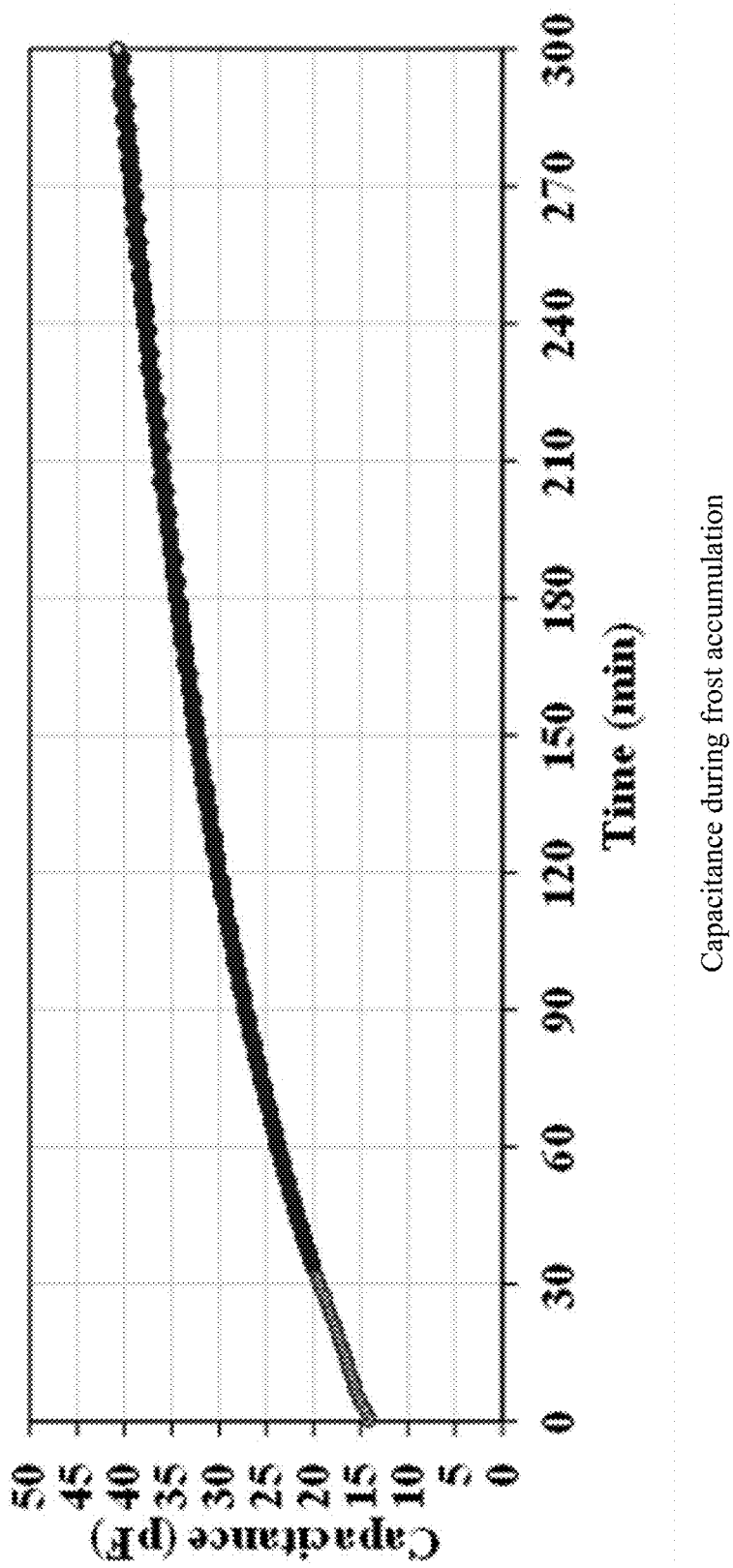
Figure 13C:
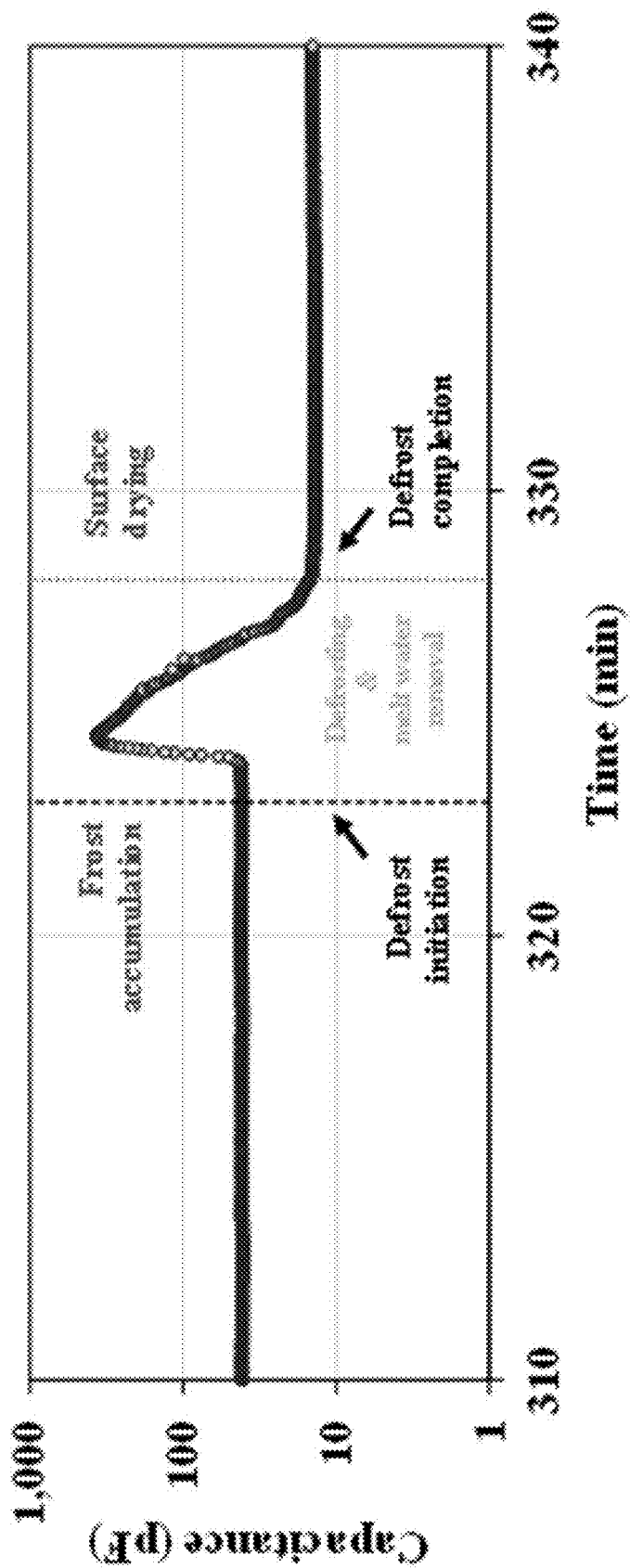
Figure 14:
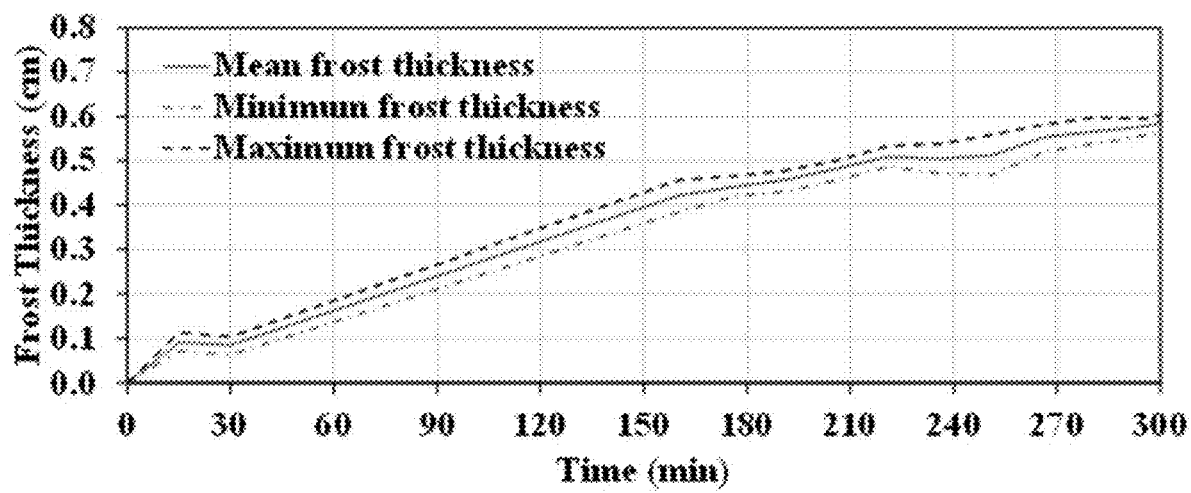
FIG. 14 provides a graph plotting frost thickness verse capacitance during a frost accumulation under test conditions: air at 3.8 C/85%.
Figure 14:
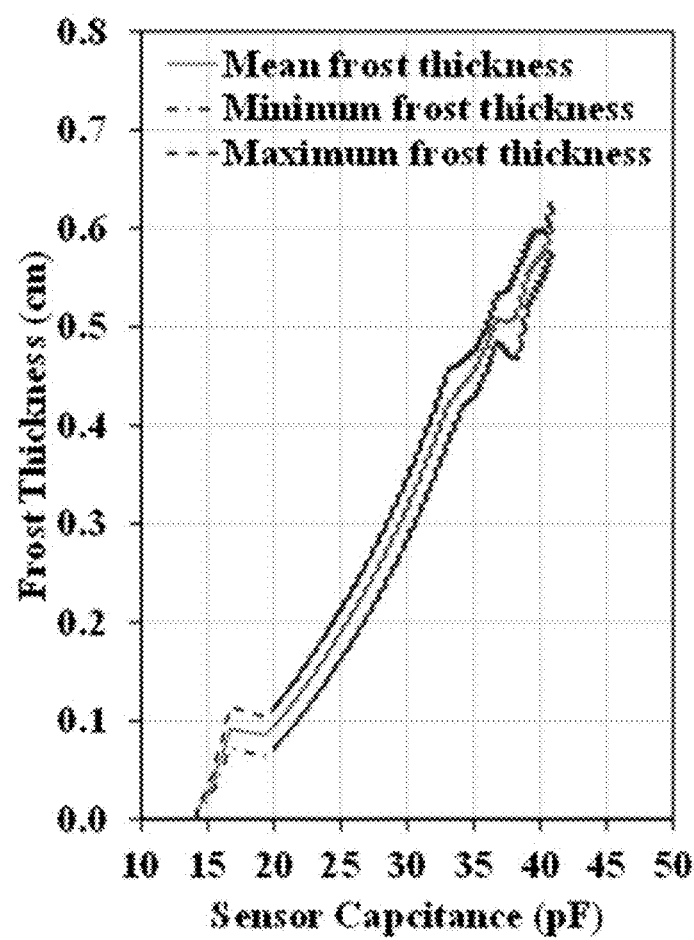

FIG. 7 also demonstrates a successful defrost. For defrosting, the standard defrosting operation process involves: (1) suspending the test bench to cool down; (2) heating with a 1.6 KW heat gun for 5 minutes to defrost; and (3) blowing dry for 5 minutes without heating to remove the water. FIG. 10 shows the entire process of defrost, melt water removal and surface drying. The corresponding capacitance variation is plotted in FIG. 7C. The frost sensor detected frost accumulation and identified defrost initiation and surface dryness. The information can support HVAC device to establish accurate defrosting initiation and termination. This enables more efficient HVAC systems and operation. In the test, the frost sensor had an overall size of 50×50 mm, including 7 interdigital electrode pairs.

The capacitive frost sensor was tested for detecting frost and defrost under two additional ambient test conditions—namely, a first test condition of 3.8° C./80 RH and a second test condition of 3.8° C./85 RH. The results of this test are shown in FIGS. 11-FIG. 14. It is apparent that the frost thickness increased with respect to the sensor capacitance, as is similar to the case results shown in FIGS. 7-9. The results validate the sensor functions well for detecting frost growth and surface dryness. Furthermore, FIG. 11A and FIG. 13A indicate that the measured capacitance level after defrosting and surface drying returns to the value at the beginning of the frosting/defrosting testing. This means the sensor performance did not degrade after experiencing the cycle of frosting/defrosting testing.

The resistive temperature sensor, part of the smart frost sensor, was fully characterized and evaluate in a temperature microchamber, which enables a temperature range of −75° C. to 200° C. and a temperature control tolerance of ±0.3° C. Tests include: (1) steady-state tests at −35, −20, −10, 0, 10, 20, 30, 40, 50, 60, 70, 85° C., each with one hour; (2) transient tests at 1° C. per minute in a range of −35° C.-85° C.; (3) repeatable verification tests in a range of −35° C.-50° C.; and (4) preliminary application in a residential refrigerator.

Figure 15:
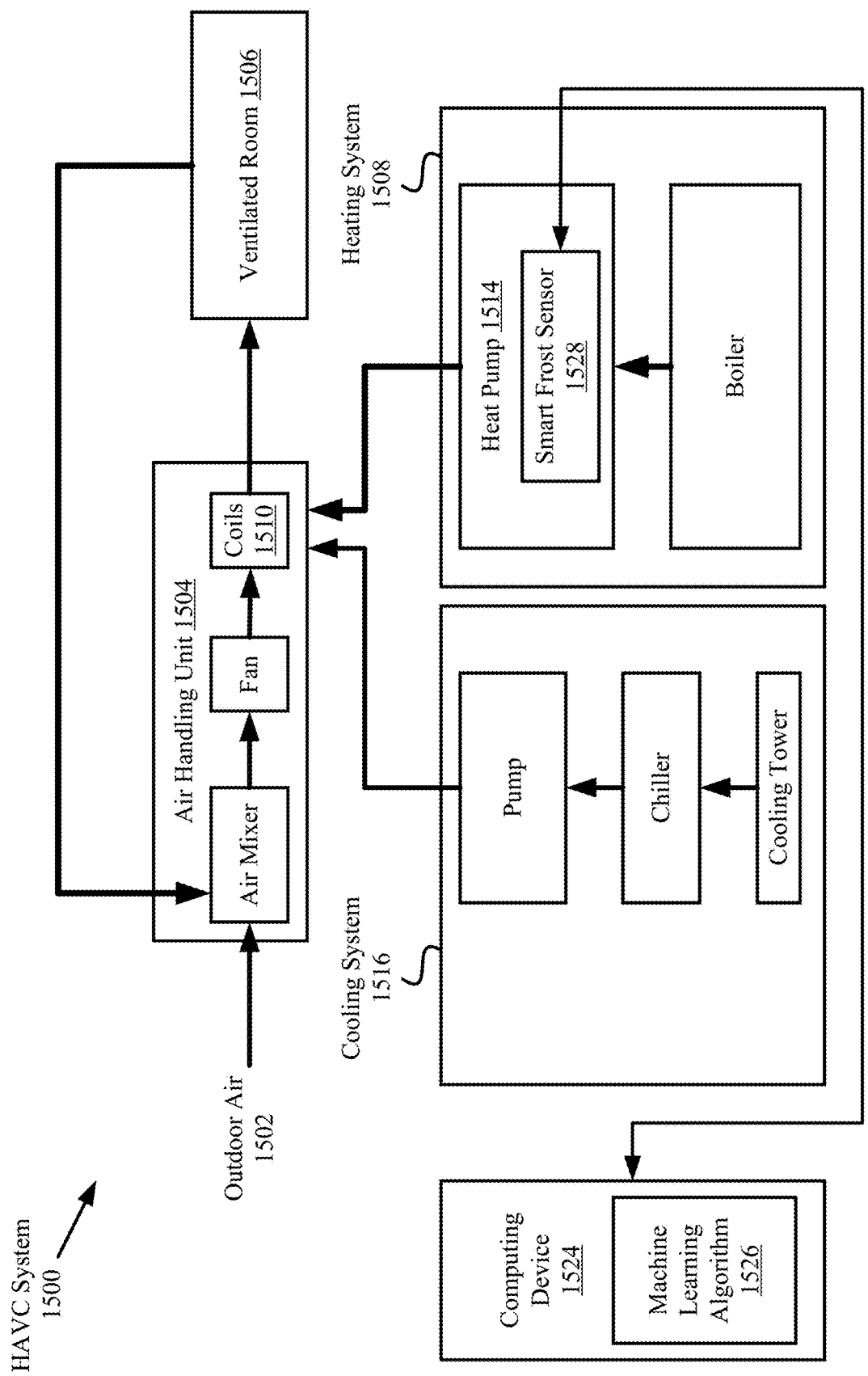
FIG. 15 provides an illustration an HVAC system implementing the present solution.

FIG. 15 provides an illustration of an HVAC system 1500 implementing the present solution. Frost accumulation is a common problem for many HVAC systems, degrading system efficiencies and leading to excessive electricity consumption. Appropriate defrosting is essential for heat pumps and refrigeration systems. However, heat pumps and refrigeration systems typically run the defrost cycle periodically based on a predetermined time interval if the outdoor coil temperature stays below the set point. Such defrosting techniques do not accurately identify the amount of frost, and thus consume excessive electricity. Therefore, HVAC system 1500 comprises one or more smart frost sensors $1528_1, \ldots, 1528_N$ which implement a capacitive sensing technique to quantify frost accumulation and identify water/ice/frost via measuring temperature, capacitance and resistance using a single integrated sensor. Each smart sensor $1528_1, \ldots, 1528_N$ adopts interdigitated comb electrodes and enables the integrated measurement of surface temperature, frost capacitance and resistance. The smart sensor $1528_1, \ldots, 1528_N$ is expected to have widespread applications in HVAC systems.

As shown in FIG. 15, the HVAC system 1500 also comprises an air handling unit 1504 configured to receive outdoor air 1502, mix the outdoor air with return air from a ventilated room 1506, and cause the mixed air to be blown over coils 1510 to heat or cool the same. The heated or cooled air is then blown into the ventilated room 1506.

A cooling system 1516 causes a chilled fluid to pass through the coils 1510 during a cooling cycle. A heating system 1508 causes a heated fluid to pass through the coils 1510 during a heating cycle. A smart frost sensor 1528 is provided with the heating system 1508. The smart frost sensor 1528 is disposed on a heat pump 1514 of the heating system 1508.

The smart frost sensor 1528 is communicatively coupled to a computing device 1524. The smart frost sensor 1528 can be the same as or similar to the smart frost sensor 200 of FIG. 2. In this regard, the smart frost sensor 1528 is configured to simultaneously or concurrently generate and output three measurements, namely a resistance based temperature measurement, a capacitance measurement and/or a resistance measurement. These measurements are passed to the computing device 1524 for processing and/or analysis.

Computing device 1524 can perform the same or similar operations as processor 220 of FIG. 2. For example, computing device 1524 is configured to obtain measurement values $R_T$, $C_F$ and $R_F$ based on signals received from the smart frost sensor 1528. The computing device 1524 can use the $R_T$ and $C_F$ values to i) determine how thickness frost/ice is accumulated on the heat transfer surface of the heat pump 1514; (ii) determine when defrosting initiates, (iii) detect residual frost/ice, melt water, and water removal after the initiation of defrosting, (iv) determine whether the substrate surface of the heat pump 1514 is wet, and (v) determine when defrosting terminates. For example, in the given example, computing device 1524 can determine that the surface of the heat pump 1514 is dry when $C_F$ has a value of 0-14 pF. In contrast, processor 220 can determine that frost grows on the surface of the heat pump 1514 is wet when $C_F$ has a value greater than 14 pF. During defrosting, the computing device 1524 can detect the phenomenon of frost or ice melting to water, water removal, and identifying the surface dryness and wetness. The computing device 1524 can determine the surface dryness and wetness by identifying water, ice or frost on the substrate surface. Water is identified when the value of $R_T$ is higher then freezing temperature (e.g., 32° F.) and the value of $C_F$ is greater than >400 pF. Frost/Ice is detected when $R_T$ is equal to or less than the freezing temperature (e.g., 32° F.) and the value of $C_F$ is between 15-50 pF. The identification of water can be validated or considered accurate when the value of $R_F$ is equal to $R_{F\text{-}water}$. The identification of frost/ice can be validated or considered accurate when the value of $R_F$ is equal to $R_{F\text{-}frost}$ (which is between $R_{F\text{-}air}$ and $R_{F\text{-}water}$).

When heavy ice or frost is identified, the computing device 1524 can perform operations to initiate or otherwise enable a defrosting process for melting the ice/frost on the heat pumps surface and/or dry the heat pumps surface. A machine learning algorithm can be used by the computing device 1524 to detect a pattern in $C_F$ values. For example, the machine learning algorithm can be trained to determine when to initiate defrosting based on the characterization shown in FIGS. 12 and 14, and detect when defrosting is completed based on the pattern shown in FIG. 13C. Upon such detection, the computing device 1524 can perform operations to initiate, stop or otherwise disable the defrosting process.

In some defrosting scenarios, the heating system 1508 can be turned on when it is a cold raining or there is relatively high humidity in the surrounding environment. The computing device 1524 can use the outputs of the smart frost sensor to detect that the heat pump surface is wet and determine that the wetness is due to rainwater. In this case, the computing device 1524 would not initiate the defrosting process.

Figure 16:
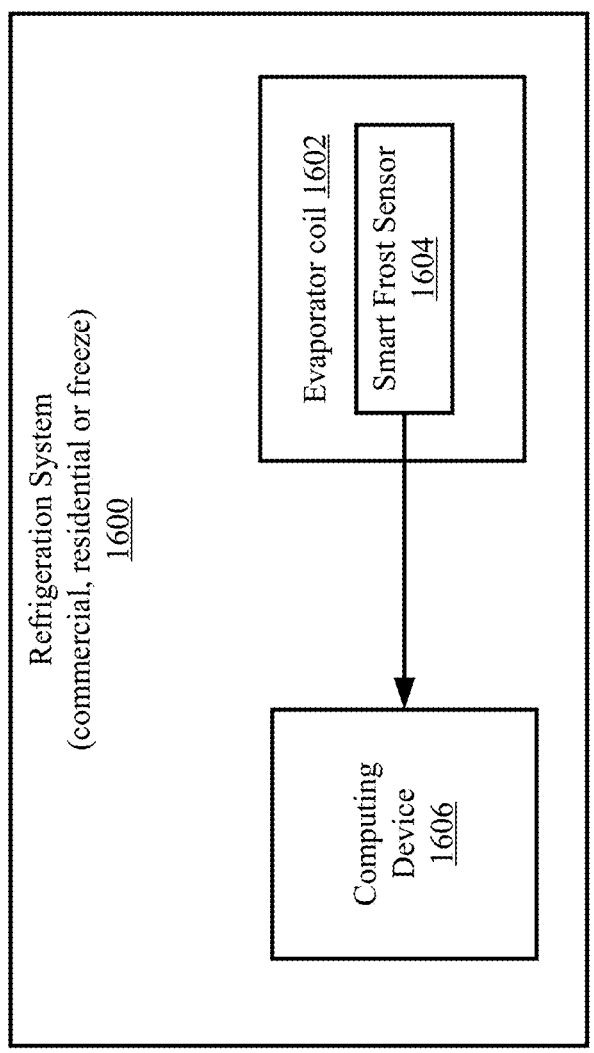
FIG. 16 provides an illustration of a refrigeration system implementing the present solution.

FIG. 16 provides an illustration of a refrigeration system 1600 implementing the present solution. A smart frost sensor 1604 is disposed on an evaporator coil 1602. During operations, the computing device 1606 processes output signals from the smart frost sensor 1604 to (i) detect frost (e.g., increased capacitance), (ii) initiate defrosting upon frost detection, (iii) detect when the surface of the evaporator coil 1602 is dry (e.g., decreased capacitance), and (iv) stop or disable defrosting upon dryness detection.

Figure 17:
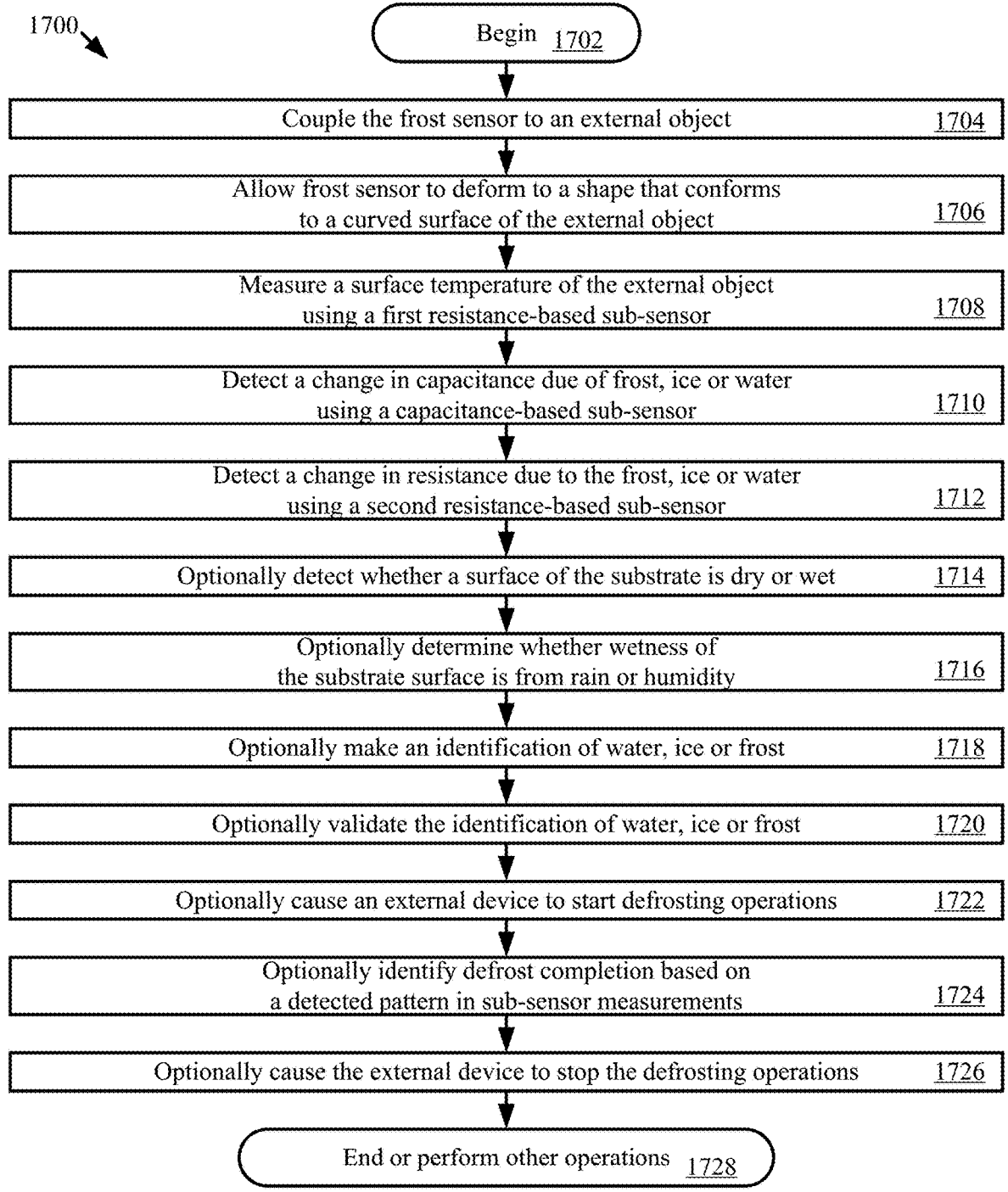
FIG. 17 provides a flow diagram of an illustrative method for operating a system including a smart frost sensor of the present solution.

FIG. 17 provides a flow diagram of an illustrative method 1700 for operating a system implementing the present solution. Method 1700 begins with 1702 and continues with 1704 where the frost sensor (e.g., frost sensor 200 of FIG. 2, 1528 of FIG. 15 or 1604 of FIG. 16) is coupled to an external object (e.g., heat pump 1514 of FIG. 15 or evaporator coil 1602 of FIG. 16). The frost sensor comprises a plurality of sub-sensors (e.g., sub-sensors 202, 204, 206 of FIG. 2) integrally formed to make a single piece. In optional block 1706, the frost sensor is allowed to deform to a shape that conforms to a curved surface of an external object without any damage to the substrate and plurality of sub-sensors.

In block 1708, a first resistance-based sub-sensor (e.g., sub-sensors 202 of FIG. 2) is used to measure a surface temperature of the external object. The first resistance-based sub-sensor is defined by a first trace (e.g., trace 230 of FIG. 2) disposed on a substrate (e.g., substrate 208 of FIG. 2) in a winding pattern.

A capacitance-based sub-sensor (e.g., sub-sensors 204 of FIG. 2) is used in block 1710 to detect a change in capacitance due of frost accumulation or icing. The capacitance-based sub-sensor is formed of a second trace (e.g., trace 232 of FIG. 2) defining a first electrode and a third trace (e.g., trace 234 of FIG. 2) defining a second electrode. The first and second electrodes comprise a plurality of interdigitated fingers or other interdigitated structures (e.g., fingers 210 of FIG. 2). The second trace (e.g., trace 232 of FIG. 2) is integrally formed with the first trace (e.g., trace 230 of FIG. 2) of the first resistance-based sub-sensor so as to define a single combined trace structure.

A second resistance-based sub-sensor (e.g., sub-sensors 206 of FIG. 2) is used in block 1712 to detect a change in resistance due to frost accumulation or icing. The second resistance-based sub-sensor is formed of a fourth trace (e.g., trace 236 of FIG. 2) defining a third electrode and a fifth trace (e.g., trace 238 of FIG. 2) defining a fourth electrode. The third and fourth electrodes comprise a plurality of interdigitated fingers or other interdigitated structures (e.g., fingers 212 of FIG. 2). The fourth trace (e.g., trace 236 of FIG. 2) is integrally formed with the third trace (e.g., trace 234 of FIG. 2) of the capacitance-based sub-sensor so as to define a single combined trace structure.

A processor (e.g., processor 220 of FIG. 2, computing device 1524 of FIG. 15 or computing device 1606 of FIG. 6) may optionally perform operations in 1714 to cause an external device to stop the defrosting operations. Upon completing 1714, method 1700 may return to 1708 to preform frosting operations once again or continue with defrosting operations of blocks 1716-1728.

The defrosting operations of blocks 1716-1728 involve: measuring a surface temperature of the external object using the first resistance-based sub-sensor; detecting a change in resistance due to the residual melting water and/or ice using the second resistance-based sub-sensor; optionally making an identification of residual melting water, ice or frost based on a temperature measurement of the first resistance-based sub-sensor and a capacitance measurement of the capacitance-based sub-sensor; optionally detecting whether a surface of the substrate is dry or wet; optionally determining whether wetness of the substrate surface is from rain or humidity via a secondarily validating the identification of residual water, ice or frost based on a resistance measurement of the second resistance-based sub-sensor; and optionally identifying defrost completion based on a detected pattern in sub-sensor measurements. In 1730, the processor causes the external device to stop the defrosting operations. Subsequently, method 1700 continues with block 1732 where it ends or other operations are performed (e.g., return to 1702).

Figure 18:
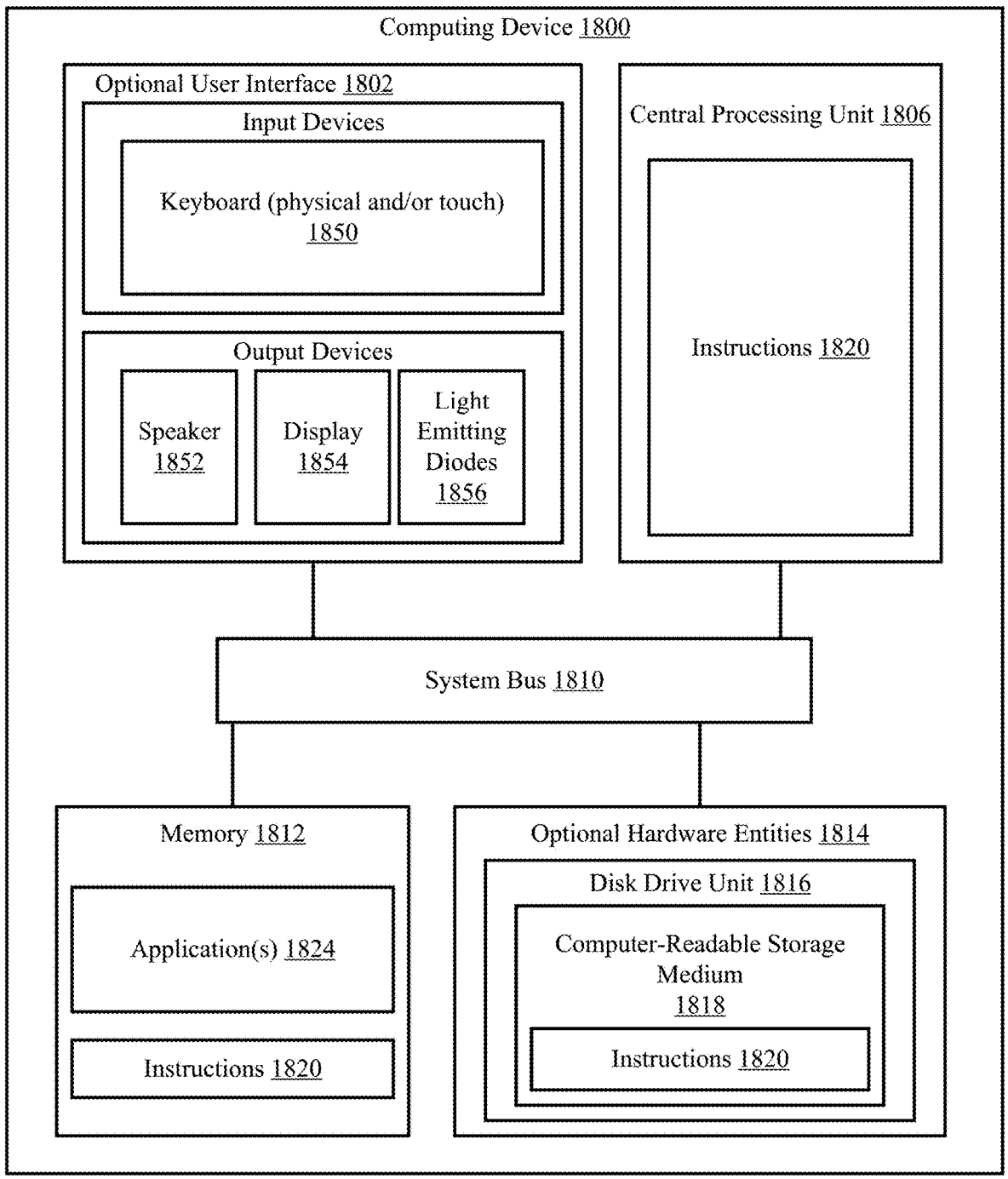
FIG. 18 provides an illustration of a computing device.

FIG. 18 provides an illustration of an exemplary architecture for a computing device 1800. Processor 220 of FIG. 2, computing devices 1524 of FIG. 15 and/or computing device 1606 of FIG. 16 (is)are the same as or similar to computing device 1800. As such, the discussion of computing device 1800 is sufficient for understanding these components 220, 1524 and 1606.

Computing device 1800 may include more or less components than those shown in FIG. 18. However, the components shown are sufficient to disclose an illustrative solution implementing the present solution. The hardware architecture of FIG. 18 represents one implementation of a representative computing device configured to enable normalizing identity claims across disparate identity directories as described herein. As such, the computing device 1800 of FIG. 18 implements at least a portion of the method(s) described herein.

Some or all the components of the computing device 1800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 18, the computing device 1800 comprises a user interface 1802, a Central Processing Unit (CPU) 1806, a system bus 1810, a memory 1812 connected to and accessible by other portions of computing device 1800 through system bus 1810, and hardware entities 1814 connected to system bus 1810. The user interface can include input devices and output devices, which facilitate user-software interactions for controlling operations of the computing device 1800. The input devices include, but are not limited, a physical and/or touch keyboard 1850. The input devices can be connected to the computing device 1800 via a wired or wireless connection (e.g., a Bluetooth® connection). The output devices include, but are not limited to, a speaker 1852, a display 1854, and/or light emitting diodes 1856.

At least some of the hardware entities 1814 perform actions involving access to and use of memory 1812, which can be a Radom Access Memory (RAM), a disk driver and/or a Compact Disc Read Only Memory (CD-ROM). Hardware entities 1814 can include a disk drive unit 1816 comprising a computer-readable storage medium 1818 on which is stored one or more sets of instructions 1820 (e.g., software code) configured to implement one or more of the methodologies, procedures, or functions described herein. The instructions 1820 can also reside, completely or at least partially, within the memory 1812 and/or within the CPU 1806 during execution thereof by the computing device 1800. The memory 1812 and the CPU 1806 also can constitute machine-readable media. The term "machine-readable media", as used here, refers to a single medium or multiple media (e.g., a centralized or distributed database, and/or associated caches and servers) that store the one or more sets of instructions 1820. The term "machine-readable media", as used here, also refers to any medium that is capable of storing, encoding or carrying a set of instructions 1820 for execution by the computing device 1800 and that cause the computing device 1800 to perform any one or more of the methodologies of the present disclosure.

In some scenarios, the hardware entities 1814 include an electronic circuit (e.g., a processor) programmed for facilitating content sharing amongst users. In this regard, it should be understood that the electronic circuit can access and run application(s) 1824 installed on the computing device 1800. The functions of the software application(s) 1824 are apparent from the above discussion of the present solution. For example, the software application is configured to perform one or more of the operations described above.

As described above, the frost sensor utilizes an integration of capacitance, resistance and temperature sensing to dynamically detect frost growth during the period of frosting and identify heat transfer surface dryness/wettability during defrosting operation. The approach is clearly different from the sensing technology used for defrosting initiation and termination in refrigeration and heat pump systems. The commercial sensing methods used in refrigeration and heat pump systems typically are based on the pre-set evaporator temperatures. The methods are detect reasonable frost accumulation level during frosting and heat transfer surface dryness/wettability during defrosting. Thus, the proposed technology provides a unique capability of assisting the defrosting control and operation in high-efficiency refrigeration and heat pump systems. The sensor technology may also be applied to many other applications like airplanes and vehicles. The material cost for the senor fabrication is much less than the conventional sensor. Thus, the sensor technology has a significant potential to replace the current defrosting sensing technology in widely refrigeration and heat pump applications.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A frost sensor, comprising:
   a substrate; and
   a plurality of sub-sensors disposed on the substrate and integrally formed to make a single sensor, the plurality of sub-sensors comprising:
   a first resistance-based sub-sensor formed of a first trace disposed on the substrate in a winding pattern and configured to measure a temperature;
   a capacitance-based sub-sensor formed of a second trace defining a first electrode and a third trace defining a second electrode, wherein (i) the first and second electrodes comprise a plurality of interdigitated fingers configured to detect a change in capacitance due to frost, ice or water present on a surface of the frost sensor, and (ii) the second trace is integrally formed with the first trace of the first resistance-based sub-sensor; and
   a second resistance-based sub-sensor formed of a fourth trace defining a third electrode and a fifth trace defining a fourth electrode, wherein (i) the third and fourth electrodes comprise a plurality of interdigitated fingers configured to detect a change in resistance due to the frost, ice or water, and (ii) the fourth trace is integrally formed with the third trace of the capacitance-based sub-sensor.

2. The frost sensor according to claim 1, wherein the frost sensor comprises a flexible circuit.

3. The frost sensor according to claim 1, wherein the frost sensor is configured to utilize integrated measurement of capacitance, resistance and temperature sensing to dynamically detect frost growth during the period of frosting and quantify transient frost layer thickness.

4. The frost sensor according to claim 1, wherein the frost sensor is configured to detect residual frost, melting water and ice during defrosting operations, and identify the heat transfer surface wettability and dryness.

5. The frost sensor according to claim 1, wherein measured frequencies used in the capacitive sensing technique covers 3000 Hz-20000 Hz.

6. The frost sensor according to claim 1, wherein the capacitance-based sub-sensor includes one or more of rectangular, round, and spiral interdigitated electrodes.

7. The frost sensor according to claim 1, further comprising a processor configured to detect whether a surface of the substrate is dry or wet based on at least a capacitance measurement of the capacitance-based sub-sensor.

8. The frost sensor according to claim 7, wherein the processor is further configured to determine whether wetness of the surface of the substrate is from rain or humidity based on a temperature measurement of the first resistance-based sub-sensor.

9. The frost sensor according to claim 1, further comprising a processor configured to make an identification of water, ice or frost based on a temperature measurement of the first resistance-based sub-sensor and a capacitance measurement of the capacitance-based sub-sensor.

10. The frost sensor according to claim 9, wherein the processor is further configured to validate the identification of water, ice or frost based on a resistance measurement of the second resistance-based sub-sensor.

11. The frost sensor according to claim 9, wherein the processor is further configured to cause an external device to start defrosting operations, responsive to the identification of ice or frost.

12. The frost sensor according to claim 11, wherein the external device comprises a heating system or a refrigeration system.

13. The frost sensor according to claim 11, wherein the processor is further configured to identify defrost completion based on a detected pattern in capacitance measurements of the capacitance-based sub-sensor.

14. The frost sensor according to claim 11, wherein the processor is further configured to cause the external device to stop the defrosting operations, responsive to identification of defrost completion.

15. A method for operating a frost sensor, comprising:
    coupling the frost sensor to an external object, wherein the frost sensor comprises a plurality of sub-sensors integrally formed to make a single piece;
    measuring a surface temperature of the external object using a first resistance-based sub-sensor of the plurality of sub-sensors that is defined by a first trace disposed on a substrate in a winding pattern;
    detecting a change in capacitance due to frost, ice or water using a capacitance-based sub-sensor of the plurality of sub-sensors that is formed of a second trace defining a first electrode and a third trace defining a second electrode, wherein (i) the first and second electrodes comprise a plurality of interdigitated fingers and (ii) the second trace is integrally formed with the first trace of the first resistance-based sub-sensor; and
    detecting a change in resistance due to the frost, ice or water using a second resistance-based sub-sensor of the plurality of sub-sensors that is formed of a fourth trace defining a third electrode and a fifth trace defining a fourth electrode, wherein (i) the third and fourth electrodes comprise a plurality of interdigitated fingers and (ii) the fourth trace is integrally formed with the third trace of the capacitance-based sub-sensor.

16. The method according to claim 15, further comprising allowing deformation of the frost sensor to conform to a curved surface of an external object without any damage to the substrate and plurality of sub-sensors.

17. The method according to claim 15, further comprising detecting whether a surface of the substrate is dry or wet based on at least a capacitance measurement of the capacitance-based sub-sensor.

18. The method according to claim 17, further comprising determining whether wetness of the surface of the substrate is from rain or humidity based on a temperature measurement of the first resistance-based sub-sensor.

19. The method according to claim 15, further comprising making an identification of water, ice or frost based on a temperature measurement of the first resistance-based sub-sensor and a capacitance measurement of the capacitance-based sub-sensor.

20. The method according to claim 19, further comprising validating the identification of water, ice or frost based on a resistance measurement of the second resistance-based sub-sensor.

21. The method according to claim 19, further comprising causing an external device to start defrosting operations performing operations, responsive to the identification of ice or frost.

22. The method according to claim 21, wherein the external device comprises a heating system or a refrigeration system.

23. The method according to claim 21, further comprising identifying defrost completion based on a detected pattern in capacitance measurements of the capacitance-based sub-sensor.

24. The method according to claim 23, further comprising causing the external device to stop the defrosting operations, responsive to identification of defrost completion.

* * * * *